United States Patent [19]
Welsh et al.

[11] Patent Number: 4,970,666
[45] Date of Patent: Nov. 13, 1990

[54] COMPUTERIZED VIDEO IMAGING SYSTEM FOR CREATING A REALISTIC DEPICTION OF A SIMULATED OBJECT IN AN ACTUAL ENVIRONMENT

[75] Inventors: William T. Welsh, Knightdale; Kenneth B. Pittman, Apex, both of N.C.

[73] Assignee: Land Development Laboratory, Inc., Raleigh, N.C.

[21] Appl. No.: 175,158

[22] Filed: Mar. 30, 1988

[51] Int. Cl.[5] ............................................. G06F 15/72
[52] U.S. Cl. .................................... 364/522; 364/521
[58] Field of Search ................. 364/522, 521; 434/38, 434/43; 340/747

[56] References Cited

U.S. PATENT DOCUMENTS

| | | | |
|---|---|---|---|
| 4,425,581 | 1/1984 | Schweppe et al. | 364/521 X |
| 4,600,200 | 7/1986 | Oka et al. | 364/522 X |
| 4,645,459 | 2/1987 | Graf et al. | 434/43 |
| 4,684,990 | 8/1987 | Oxley | 364/522 X |
| 4,736,306 | 4/1988 | Christensen et al. | 364/522 X |
| 4,805,121 | 2/1989 | Scott et al. | 434/43 X |
| 4,835,532 | 5/1989 | Fant | 340/747 X |

OTHER PUBLICATIONS

R. A. Alspektor, "PC-Based Photography: A New Sales and Marketing Tool for the Building, Design and Construction Industry", *Electronic Photography News*, vol. 1, No. 1, pp. 5-6, Sep. 1987.
R. A. Alspektor, "PC Based Photography as a Marketing Tool", *Versatility*, pp. 37-40, Jul. 1987.
O. R. Witte, "The Computer as a Tool for Making Presentations", *Architecture*, vol. 77, No. 4, pp. 112-114, Apr. 1988.
B. Orland, "Image Advantage", *Landscape Architecture*, vol. 76, No. 1, pp. 58-63, Jan./Feb. 1986.
E. Grissett, "Comptuer Images Bring Blueprints to Life", *Business: North Carolina*, Sep. 1986.
J. Schwarz, "Seeing the Future", *American Way*, pp. 56-59, Feb. 1, 1987.
"Fron Now On, Design Time Will Be Measured in Minutes Instead of Days." Business Information Technologies, Inc. advertisement appearing in *Landscape Architecture Magazine*.
"Cover Story", Cubicomp Corporation advertisement.
E. Teicholz and M. Sena, "Facility Planning & Management", *Computer Graphics World*, pp. 34–58, Jun. 1987.
B. Bottorff, "Image Computing", *Versatility*, pp. 29–40, Jul. 1988.
A. Meyer, "Determining the Eyepoint in 3-Point Perspective", *Versatility*, pp. 29–32, Sep. 1987.

(List continued on next page.)

*Primary Examiner*—Gary V. Harkcom
*Assistant Examiner*—Mark K. Zimmerman
*Attorney, Agent, or Firm*—Bell, Seltzer, Park & Gibson

[57] ABSTRACT

A system and method for producing highly realistic video images which depict the appearance of a simulated structure in an actual environment, and provides for accurate placement of the structure in the environment and matching of the perspective of the structure with that of the environment so that a highly realistic result is achieved. The system includes a video input means, such as a video camera and video recorder, by which a video image of the actual environment may be captured. A graphics processor unit receives the video image from the video input means and stores it in rasterized form. Field data input means is provided for receiving field location data regarding the precise location of the captured video image and field perspective data regarding the perspective of the captured image. Object data input means is also provided for receiving data, such as CAD data for example, for a three-dimensional model of a simulated object which is proposed to be included in the environment. From the three-dimensional model of the object, a two-dimensional perspective representation of the object is generated, which accurately matches the perspective of the captured video image. The thus generated two-dimensional perspective representation is then merged with the rasterized video image and accurately positioned at its proper location in the environment.

35 Claims, 8 Drawing Sheets

OTHER PUBLICATIONS

E. Zube, et al., "Perceptual Landscape Simulations: History and Prospect", *Landscape Journal*, vol. 6, No. 1, pp. 62–76, 1987.

J. Mertes and R. Smardon, "Applications of Video (VTR) Technology in Landscape Planning, Design and Management", submitted to the *Landscape Journal* Jan. 1985.

R. Smardon, "Assessing Community Image: Tools for Perception and Consensus Building", Environmental Preference and Landscape Management Symposium at Connecticut College, Oct. 21–22, 1983.

R. Smardon, "A Visual Approach to Redesigning the Commercial Strip Highway", *Transportation Research Record* 1016, 1985.

R. Lambe and R. Smardon, "Colour Photocopy for Visual Simulation".

G. Willmott, et al., "Waterfront Revitalization in Clayton, N.Y.", *Small Town*, pp. 12–19, Nov.–Dec. 1983.

L. Trettis, "Image Network Lets You See the Building Before It's Built", *The Business Journal*, vol. 2, No. 46, pp. 1 and 10, Feb. 22, 1988.

COMPUTERIZED VIDEO IMAGING SYSTEM FOR CREATING A REALISTIC DEPICTION OF A SIMULATED OBJECT IN AN ACTUAL ENVIRONMENT

BACKGROUND OF THE INVENTION

This invention relates to video imaging technology, and more particularly, concerns the application of video imaging technology for creating realistic video images depicting the appearance of a simulated object in an actual environment.

Architects and other design professionals have for many years relied upon an artist's sketch or rendering to communicate the appearance of a proposed design project and how the project would interact with its environment. With the advent of computer video imaging technology, there has been considerable interest in applying this video imaging technology as a tool for the architect or designer to produce video images showing how proposed projects and designs would appear in an actual environment. This has the advantages of providing a presentation medium that can be easily understood by most viewers, regardless of their background, and these simulations are very realistic and are void of stylistic touches.

For example, systems have been proposed which permit captured video images to be "cut and pasted" together to create a composite image. The results are analogous to a photo montage. The system may even provide an image library of objects, for example, images of trees, which can be retrieved and "pasted" into a background image of an actual scene. However, since the video images of the proposed objects are pixel-based (bit-mapped) images, there are severe limitations in the amount of manipulation and modification which can be made of the images.

CAD (computer aided design) systems have become available which operate like a computerized drawing board and enable an architect, designer, planner, or engineer to create three-dimensional computer models of proposed projects and structures, and to display these structures from various orientations, e.g. plan views, elevational views and perspectives. While the available CAD systems serve as an excellent tool in designing and illustrating the proposed structures, existing CAD systems do not attempt to provide a way to show how the CAD model of the structure would appear in a particular environment.

Systems have been proposed in which a CAD-generated image of a proposed building or the like is overlaid onto a video background showing an actual environment. This approach is shown for example in the July 1987 issue of *Versatility*, published by Ariel Communications, Inc., Austin, Tex., where on the cover there is shown a CAD-generated image of a building overlaid onto a captured video background of an urban area. To the untrained eye, this image may appear reasonable. Upon closer inspection, however, it becomes apparent that the perspective of the rendered building is much different from the perspective of the image in the background. The image was created through a process which involved approximation and "eyeballing". Indeed, in the following month's issue of the magazine the author explained why the previous month's cover image was inaccurate and how he went about creating this approximation. Other systems have been proposed, or introduced, which similarly seek to superimpose a CAD-generated model into a video image of an environment. However, such systems are largely experimental or developmental, and lack facilities to insure accuracy and realism in the resulting images.

With the foregoing in mind, it is an important object of the present invention to provide a system and method for producing highly realistic video images depicting the appearance of a simulated structure in an actual environment. More particularly, it is an object of this invention to provide a video imaging system of the type described which deals with the accurate placement of the structure in the environment and matching of the perspective of the structure with that of the environment so that a highly realistic result is achieved.

SUMMARY OF THE INVENTION

The video imaging system of the present invention is designed to insure the accurate placement of a simulated object in a video-derived image of the environment and to insure that the perspective of the simulated object closely matches that of the environment. As a result, a highly realistic video image simulation is obtained.

The video imaging system includes a video input means, such as a video camera and video recorder, by which a video image of an actual environment may be captured. A graphics processor unit receives the video image from the video input means and stores the video image in rasterized form. The system also provides field data input means for receiving field location data regarding the precise location of the captured video image and field perspective data regarding the perspective of the captured image. Object data input means is also provided for receiving data, such as CAD data for example, for a three-dimensional model of a simulated object which is proposed to be included in the environment. The system provides means for generating from the three-dimensional model of the object, through the use of the field perspective data, a two-dimensional perspective representation of the object in a perspective which accurately matches the perspective of the captured video image of the actual environment. Finally, the system provides means for merging the thus generated two-dimensional perspective representation of the object with the rasterized video image of the actual environment and for positioning the object, through the use of the previously entered field location data, so that the object is precisely positioned at the proper location in the actual environment. The resulting video image simulation may then be output to a suitable video output device, such as a television monitor, video recording device, paper printer, or a suitable data storage medium.

The field data input means may additionally include means for receiving data relating to the ambient conditions which existed at the time and location where the video image was captured. Thus, information regarding weather, date, and time of day may be recorded and entered into the system. This information can be used in rendering the model to insure that the lighting (e.g. sun angle and color temperature) closely matches that of the actual environment.

The level of detail of the three-dimensional model can range from a relatively simple wire frame model, to a solid model, or to a solid model with surface texturing added. The system can include a material and texture library which contains a collection of raster/texture "maps" defining available materials and surface textures for the object, such as for example, brick, concrete, stucco, glass, etc., and the system provides texture mapping means for imparting to the object a surface appearance defined by a map selected from the material and texture library.

To further enhance the simulation, the imaging system provides an image library containing a collection of additional image elements for the environment, such a trees, shrubbery, and other landscaping features similar to the items provided in traditional architectural entourage books. A pre/post processing Image Enhancement Module is provided which enables the user to select additional image elements from the image library and to add such elements to the merged image. Thus, not only can the video imaging system show the appearance of a building in an actual environment, but it can also show how the building would appear after landscaping and other site enhancements are provided.

The system further provides an equipment calibration unit by which calibration data can be generated relating to the optical and electronic signal characteristics of particular pieces of video input equipment which may be used to capture the video image. An equipment calibration library is provided for storing the equipment calibration data. This feature makes it possible to use a number of different video input devices and to insure consistent and accurate results therefrom.

The three-dimensional model of the object which is to be illustrated can be created and defined either through the use of an internally provided CAD package, or through the use of external data. Since many architects, planners and engineers already make use of CAD systems in designing buildings and structures, the present invention provides a translation capability whereby existing CAD data in a variety of different data formats can be translated into a standard CAD data format usable by the video imaging system.

Many additional features and advantages of the present invention will become apparent from the detailed description which follows, and from the accompanying drawings.

DETAILED DESCRIPTION

System Overview

The present invention will now be described more fully with reference to the accompanying drawings, in which an illustrative embodiment of the invention is shown. This invention can, however, be embodied in many different forms and the present invention should not, therefore, be construed as being limited to the embodiment set forth herein. Rather, the specific embodiment which is illustrated and described herein is provided for purposes of illustration and in order to fully convey to those skilled in the art the broad scope of this invention and how it is capable of being used.

The embodiment of the invention which is illustrated in the accompanying drawings in the detailed description which follows will be referred to for convenient reference as the "STUDIO" System.

Figure 1:
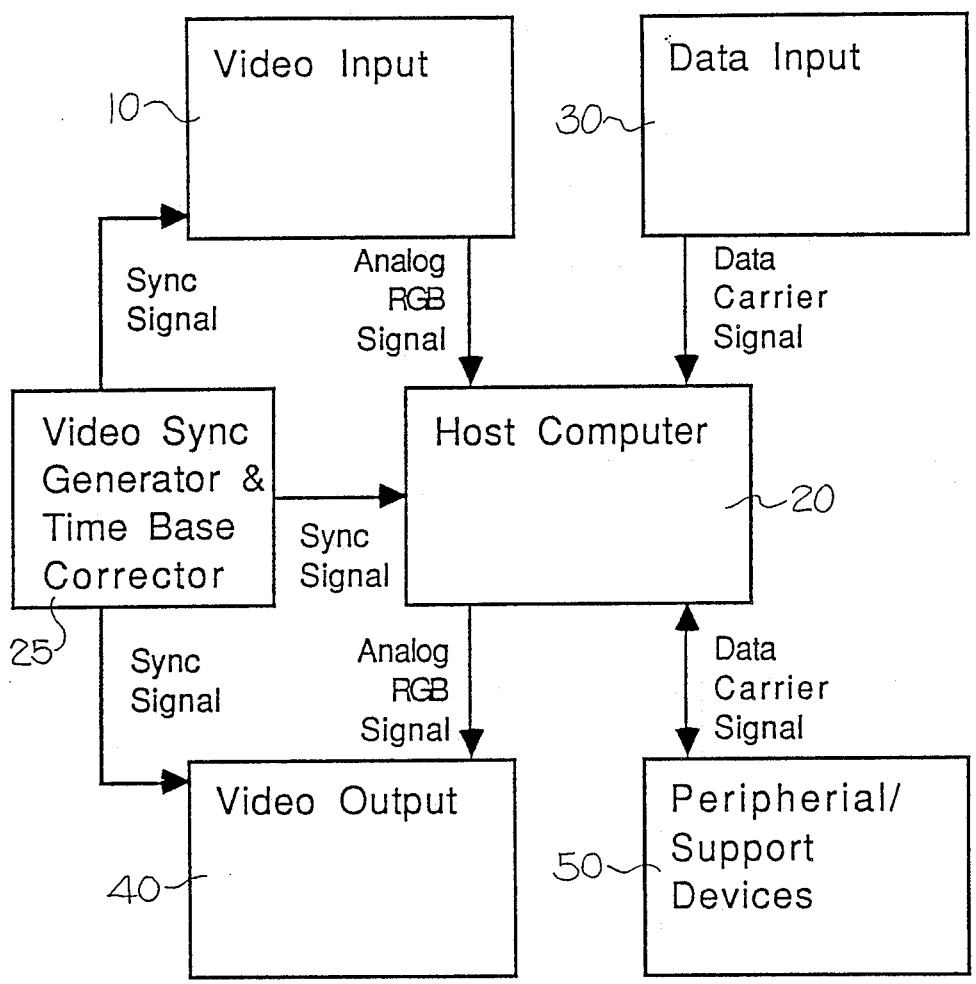
FIG. 1 is a block schematic diagram showing the major components of the video imaging system of the invention.

FIG. 1 shows the basic components of the STUDIO System. The video input means 10 include those components which are used to record live video for input into the system and for processing composite video signals into component red-green-blue (RGB) signals which are required to input image data into the graphics processor device in the host computer 20.

The host computer 20 is the device in which all image capture and processing takes place. The host computer 20 contains several support devices which provide mass storage media for supporting software and data storage, expanded memory for processing functions, and a graphics processor. The graphics processor includes a graphics frame buffer having the capability of converting a live RGB signal into computer readable format in real-time (one frame-two fields-every one/thirtieth of a second). From this stream of digitized images, the frame buffer can be directed to grab a single frame of video at any time. The process of converting the live video image into digital format and grabbing a single frame is referred to as "capturing" an image.

Data input means 30 include a range of peripheral components which can be used to input numeric or digital data into the host computer for various purposes. It is through the data input means 30 that data defining a CAD model of a building or object is input into the system.

The video output means 40 include those components which are used to record or display the images processed by the host computer 20. The video sync generator and time base corrector 25 are video devices which are shared by the video input means 10 and video output means 40. They generate a common timing synchronization signal which all of the video devices can use to coordinate the timing of the video frame generation. The peripheral support devices 50 are those devices which allow other avenues of interaction with the computer, supply enhanced data storage capabilities, provide additional means to generate documents, provide network access to other computers, etc.

In summary, the overall operation of the video imaging system of the present invention involves capturing a video image of an actual environment through the use of the video input means 10, providing the video image data to the host computer 20 where it is stored in rasterized form, and obtaining field location data regarding the precise location of the captured video image, as well as field perspective data regarding the perspective of the captured image and providing this information to the system via the data input means 30. Object data defining a three-dimensional model of a simulated object which is proposed to be included in the environment is also provided to the host computer 20 via the data input means. This may suitably take the form of a CAD data file describing the structure of the object. This CAD data file can be created externally and ported to the host computer or created with the assistance of the facilities of the host computer. This object data defining the three-dimensional model of the object is processed in the host computer 20, using the field perspective data previously entered, to produce a rasterized two-dimensional image illustrating a perspective representation of the object in a three-dimensional perspective which accurately matches the perspective of the captured video image of the actual environment. Then, the thus generated rasterized two-dimensional perspective representation of the object is merged with the rasterized video image of the environment in such a way that the object is precisely positioned at the proper location, scale and orientation in the environment. For this purpose, the system makes use of the field location data previously entered which accurately fixes the location of specific points in the environment, as well as using defined reference points on the object which fix where the object is to be located in its environment. Further details of this process and the hardware and software components utilized in the execution of this process are given later in this specification.

Capturing the Video Image

Figure 2:
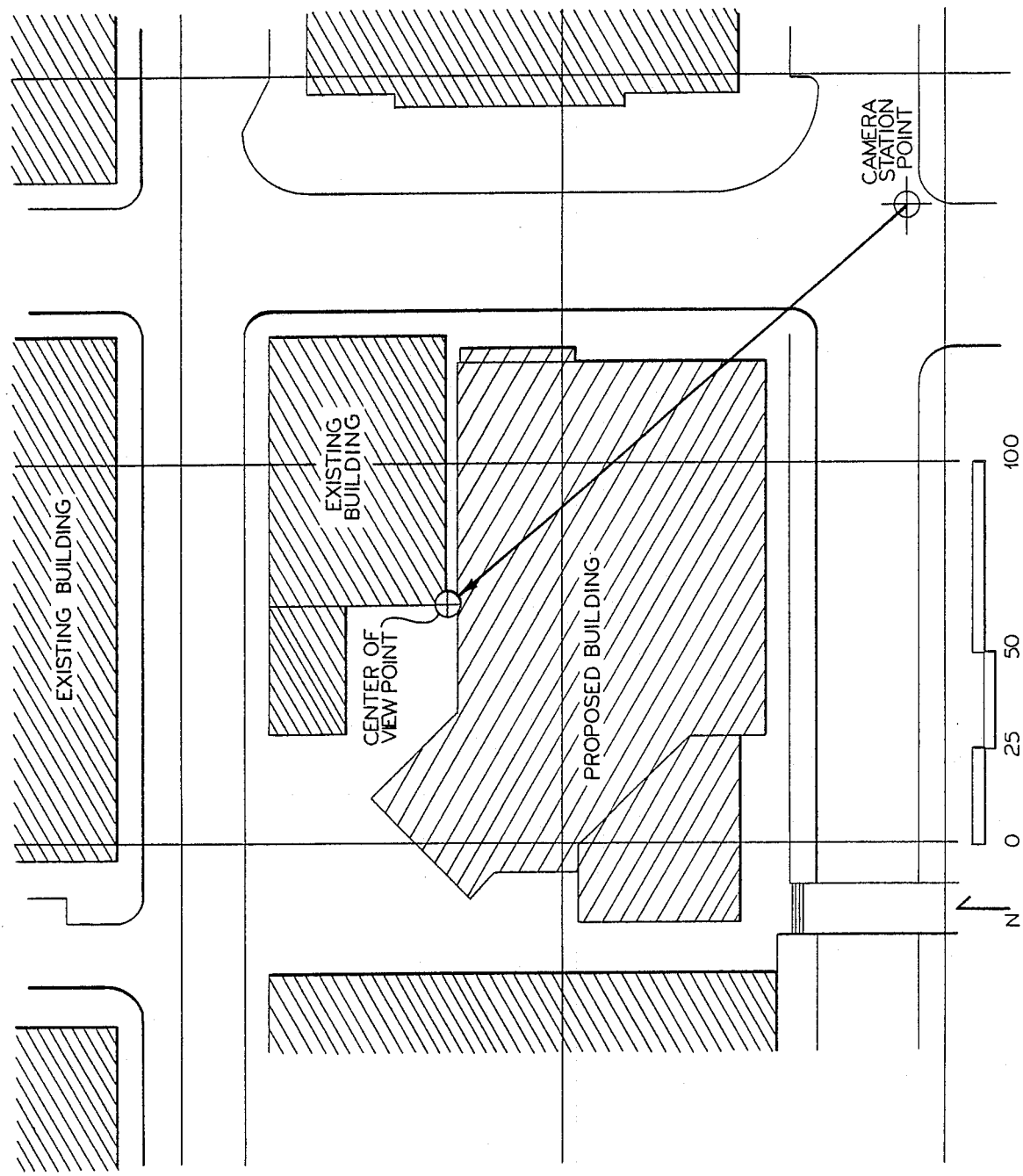
FIG. 2 is a map showing the site of a proposed building project, for which a video image simulation is to be produced pursuant to the present invention, and showing the proposed location of the building on the site as well as the location of the video camera used to capture a video image of the actual environment of the proposed building.

FIG. 2 is a map showing the site of a proposed building project where an office building is to be built. The building site is shown in the map, as well as a number of topological features, existing buildings and landmarks. The map also indicates the location of the video camera used to capture a video image of the actual environment as well as the center of view of the camera.

The video image of the actual environment is captured using suitable video equipment, such as a portable video camera and portable video tape recorder. A suitable vantage point for the video photography of the environment is selected and the environment is photographed and recorded on video tape. At this time, the camera location (i.e., vantage point) is carefully recorded, as are camera settings and the point in the distance which forms the center of view of the captured image. Any suitable coordinate system can be employed for recording the camera information. One particularly useful and suitable system is the state plane coordinate grid system, which is conventionally used by surveyors. This includes the easterly, northerly and elevational coordinates with respect to a predetermined origin point. The state plane coordinate system grid is shown in FIG. 2 for the proposed building site of our illustration. The camera vantage point, direction (center) of view, and camera settings are needed to determine the perspective of the captured video image so that any objects which are added to the actual environment can be rendered in the same perspective.

The direction of view of the camera can be identified either by recording the particular direction that the camera is oriented, or preferably by noting the coordinate locations of a distant object located in the true center of view of the camera/lens system utilized. The coordinate locations of this distant point are identified from suitable topological maps or surveys. In determining the true center of view of the camera/lens system, each individual camera and lens must be calibrated since this will vary from camera to camera. In addition, other camera settings are recorded including lens settings, camera settings, camera height from the ground and angle of the camera from the horizontal.

Existing landmarks in the view of the camera, such as buildings, fence lines, and pavement are noted so that the actual coordinate locations of these landmarks can be identified from existing maps or surveys. If no suitable landmarks are present within the field of view of the camera, then an actual survey of the area of view of the camera may be necessary, and temporary landmarks of specified location and dimension may be erected for the purpose of providing suitable landmarks to be used in the reconciliation of overlays.

The environmental conditions, date and time of day are also noted and recorded, as they will be used in setting lighting positions and color in the rendering software at a later step, so that the lighting direction and color temperature used in rendering the object will accurately match that of the environment in which it is placed.

Figure 3:
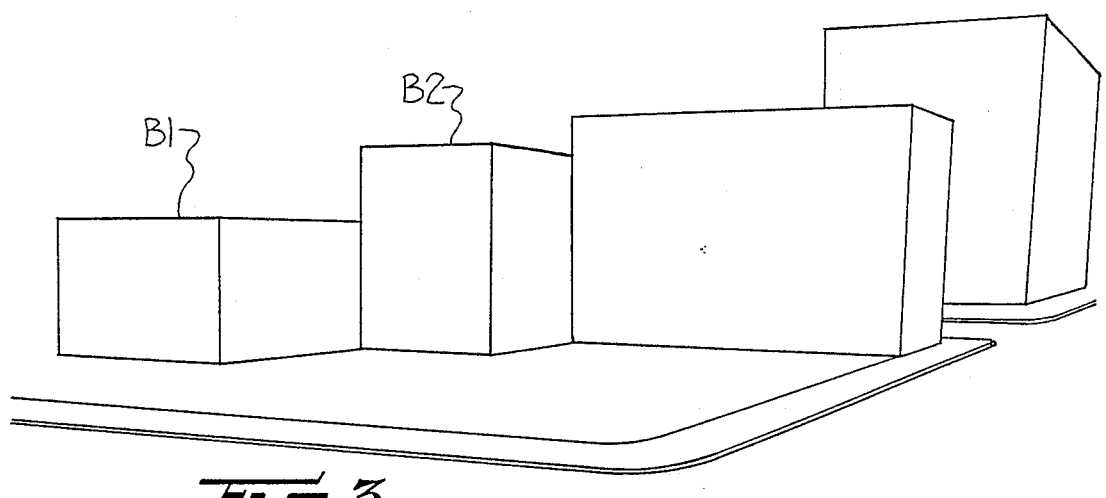
FIG. 3 is a perspective view of the building site, as captured by the video camera from the vantage point indicated in FIG. 2.

FIG. 3 is a simplified line drawing showing the video image of the building site, as captured by the video camera from the vantage point indicated in FIG. 2. This video image is converted into a rasterized format, as explained more fully below, and is used as the background into which the simulated object, e.g. building model, will be merged. The building indicated by the reference character B1 will be demolished during the construction of the proposed new building, while the building indicated at B2 will be partially demolished and reduced in size to accommodate the new building structure, as will be seen from the site plan of FIG. 2. During preprocessing of the captured background image, as explained more fully later, the rasterized video image will be retouched to remove the image of building B1 and to reduce in size the image of building B2.

Figure 4A:
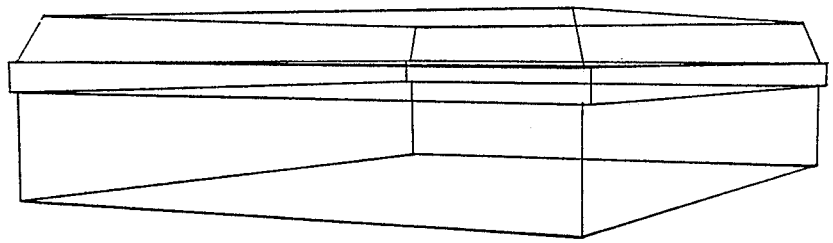
FIG. 4A is a perspective view showing a wire-frame CAD model simulation of the proposed building.
Figure 4B:
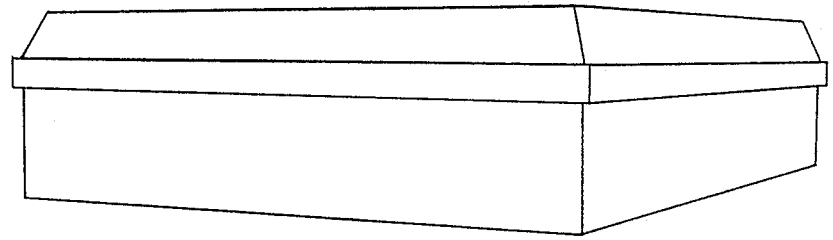
FIG. 4B is a perspective view showing a solid surfaced CAD model of the proposed building.
Figure 5:
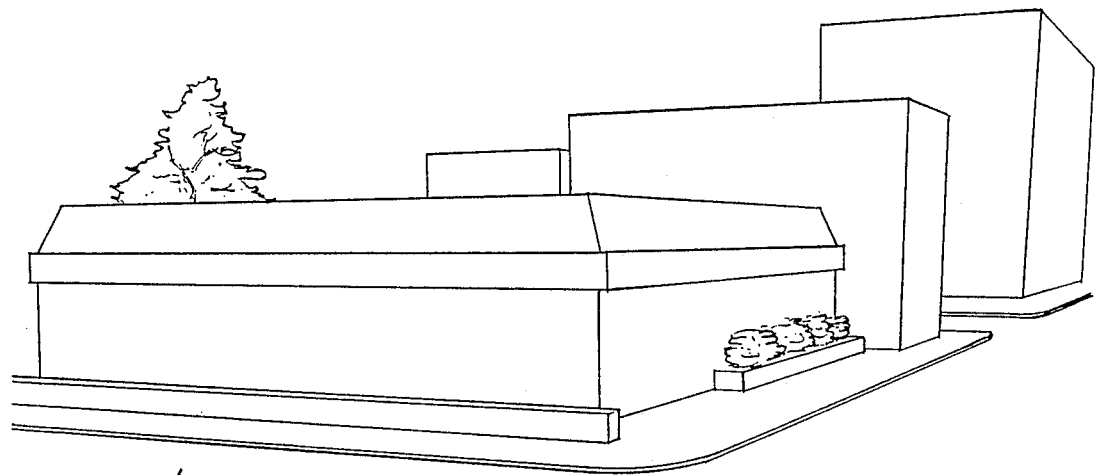
FIG. 5 is a perspective view illustrating the simulation produced in accordance with the present invention, wherein the CAD model of FIG. 4b is superimposed onto the actual building site of FIG. 3.

FIG. 4A is a perspective view showing a relatively simple wire frame CAD model simulation of the proposed building, while FIG. 4B is a perspective view of the same building rendered as a solid surfaced CAD model. This model is accurately superimposed onto the background image at the proper location and with the proper perspective to yield a video image simulation such as that shown in FIG. 5. It will be noted that certain landscaping features (tree and shrubbery) have also been added to the simulation.

Hardware Components

Figure 6A:
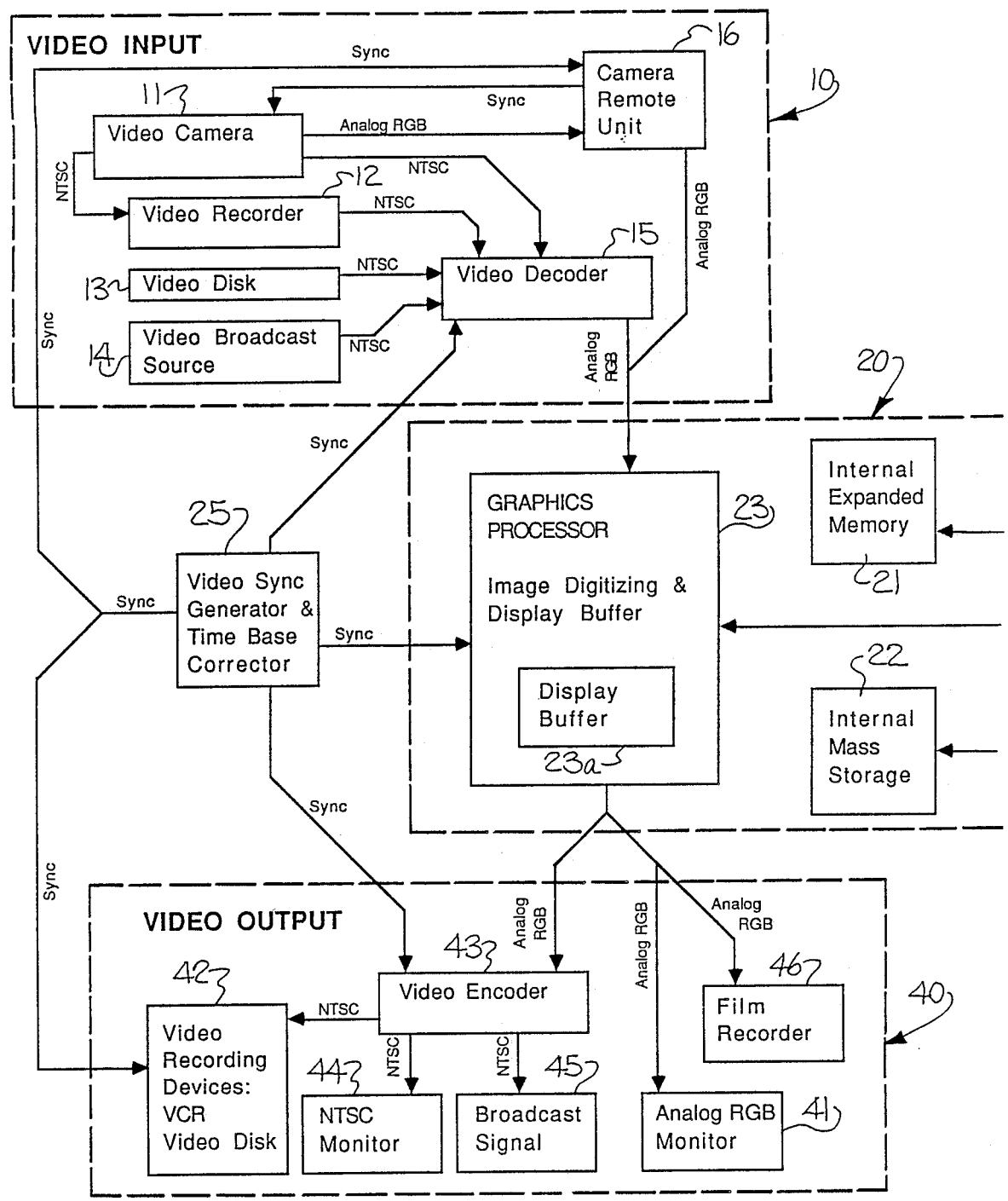
FIGS. 6A and 6B are block schematic diagrams similar to FIG. 1, which taken together illustrate in more detail the hardware components and associated software used in the video imaging system of the invention.
Figure 6B:
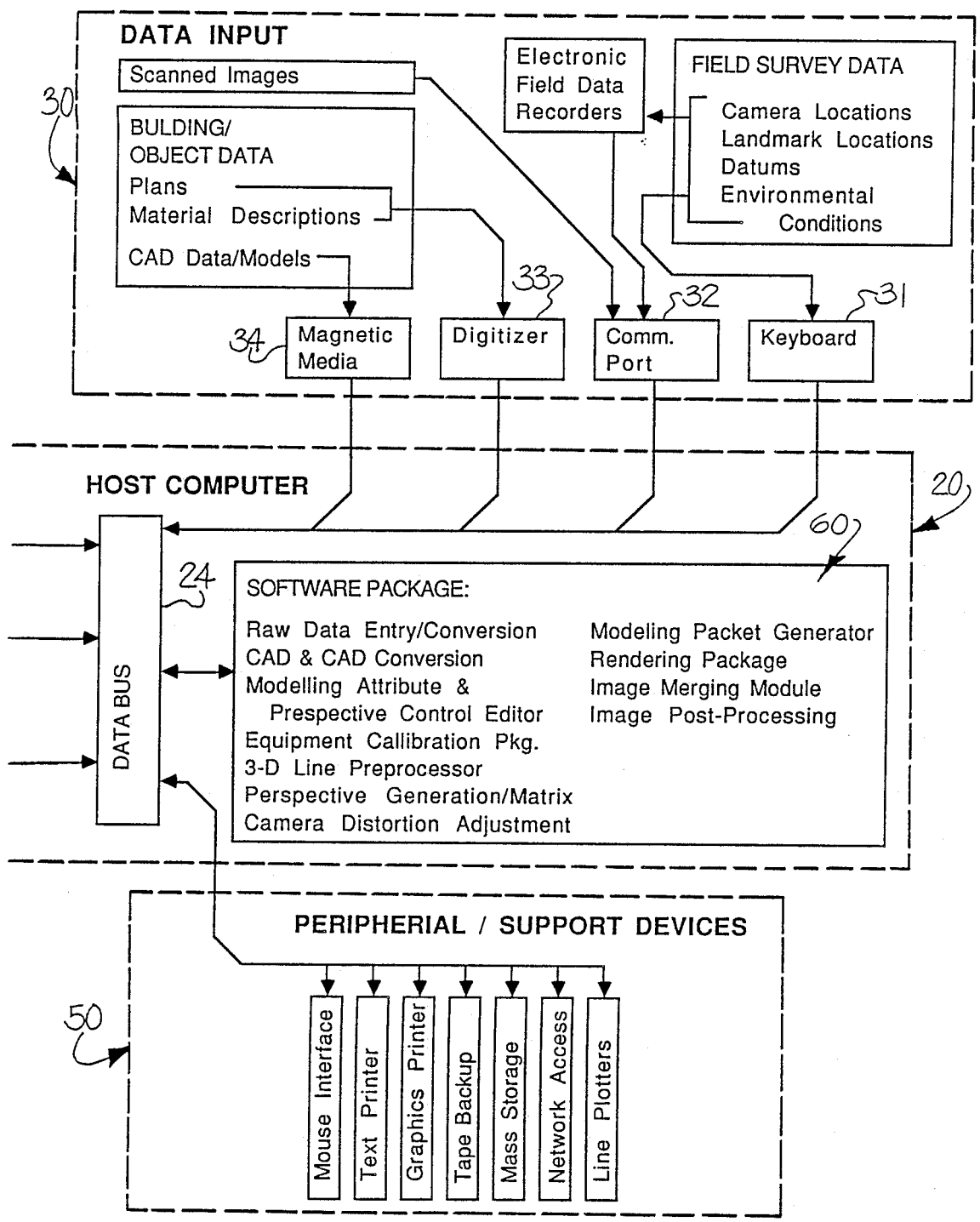

The hardware components described earlier with reference to FIG. 1 are illustrated in greater detail in the block schematic diagram of FIGS. 6A and 6B. The right hand margin of FIG. 6A joins the left hand margin of FIG. 6B. The video input means 10 includes a video camera 11 and a suitable recording device for recording the video images such as a video recorder 12. Alternative video input media include a video disk 13, video images captured from a video broadcast source 14, or an optical scanner for scanning images supplied in other than video form, such as photographic images. Scanned image data may be input to the system by any suitable means, such as via the communication port 32 as shown in FIG. 6B. Depending upon the format of the video signal obtained from the camera and/or recording device, and the video signal format required by the graphics processor unit, a video decoder unit 15 may be required. The video input means may also optionally include a camera remote unit 16, which allows for greater control of the camera and can generate a RGB signal directly from the camera. In the illustrated embodiment, the graphics processor unit requires an analog RGB video signal. The signal obtained from the video camera or video recorder is a standard NTSC video signal (a composite signal) which is converted by the video decoder 15 into an analog RGB signal. However, as is illustrated in the box 10, if the video camera is capable of producing an analog RGB signal (via a remote unit), it can be sent directly to the graphics processor unit, bypassing the video decoder 15.

The host computer upon which the video simulation system operates is indicated broadly by the reference character 20. Suitable host computers include those commercially available microcomputers based upon the Intel 80286 or 80386 microprocessors, such as the IBM AT, IBM PS2 Models 50, 60 or 80, Compaq 386 and the like, or the Motorola 68020 processor such as the Apple Macintosh II. The computer is preferably equipped with internal expanded memory 21 and with a suitable internal mass data storage device 22 such as a high capacity hard disk drive. The computer is equipped with a graphics processor board 23 which can take the analog RGB video signal and convert it to a digital format representing the R (red), G (green) and B (blue) components for each pixel of the captured image, which is stored in numerical form in the computer memory. Suitable graphics processor boards of this type include the TARGA series boards produced by AT&T. These graphics boards are capable of rapidly converting an analog RGB signal into a rasterized format and back to an analog RGB signal in real time. The software components of the system of the present invention are generally indicated in FIG. 6 by the reference character 60, and are illustrated and described in greater detail in FIG. 7 and the accompanying description.

The data input means to the system are indicated generally by block 30 and include a keyboard 31, a communications port 32, a digitizer pad 33, and a magnetic media input device 34 such as an internal or external floppy disk drive.

The video output means employed in the present invention are indicated in the block identified by the reference character 40. These include a suitable high resolution graphics monitor 41, which is used throughout the process, and a video recording device 42, such as a video cassette recorder or video disk. As illustrated, a video encoder 43 is provided for converting the analog RGB video signal obtained from the graphics processor board 23 into a standard video format, such as the NTSC standard video signal used by the video recording device 42. The video output means of the present invention may also include an optional NTSC monitor 44, a broadcast signal output unit 45, and a film recorder unit 46 capable of recording the video graphics displayed directly onto photographic film.

The system may also include a number of additional peripherals and support devices conventionally used in association with computer systems. These are generally indicated in the box identified by the reference character 50 and include a mouse interface capable of connection to a mouse or other suitable pointing device, various kinds of printers such as text printers, graphics printers, plotters, etc., ancillary data storage devices such as a tape backup or optical disk drive for saving the rasterized video image for storage and later access. As illustrated, the system may also include a network access board for connection to a suitable local area network.

A video sync generator and time base correction unit 25 are also connected to the graphics processor board 23 and to the various video input and output devices.

The Simulation Process

As an initial step in the simulation process, data is assembled and collected regarding the location or site of the simulation. This information is used to plan for the camera shots, for supplying locational data, and as a repository for field data and notes. For outdoor building sites, topographic maps serve as an excellent source of data, since they contain contour information (ground elevations) and usually include street layouts and building locations. If necessary, site surveys can be performed to obtain additional detailed data. One or more suitable camera vantage points are selected, and through the use of the map or survey data the locations of the camera vantage points are accurately identified. In addition, other locations in the site are identified, such as the locations of any relevant elements or landmarks in the environment.

The image data is typically collected in the form of video tape footage, although for some simulations other forms of photography may be used. The camera positions are recorded on existing maps with field measurement notes relating the camera position to existing landmarks. The camera position, its center of view, and other critical locations relative to the environment are recorded in relation to a known coordinate system.

The coordinate system which is selected for a particular simulation becomes the referencing system relative to which all data is tied. While any coordinate system can be employed, it is most convenient and desirable to use a known existing coordinate system. Use of an existing coordinate system carries the advantage of having an existing data base associated with the common reference grid in the form of maps. One particularly suitable coordinate system is the state plane coordinate system. This coordinate system is used as the basis for all governmental maps and any survey work done on a site which is to recorded with a governmental agency. The consistent use of this coordinate system has the further advantage that as long as collected data is related back to this system, data collected from different projects can be directly compared and combined on a state wide level. It may, however, in some applications be advantageous to establish a local or arbitrary coordinate system for a particular project.

Rasterization of the Video Image

In the rasterization process, the video tape of the environment is played back on suitable playback equipment 12 and the NTSC video signal is passed through a decoder 15 (see FIG. 6), which breaks down the broadcast NTSC video signal into component red, green and blue signals (analog RGB). The signals, along with a sync signal from video sync generator 25, are passed on to the graphics processor 23 within the computer. The graphics processor 23 takes these signals and performs an analog to digital conversion in real time. The graphics processor has an analog RGB output, which can be connected to an RGB monitor 41 so that the process can be observed. The graphics processor 23 also contains a display buffer 23a capable of storing an entire frame of rasterized image data comprised of two interlaced fields. The digital information in this display buffer describes the red, green and blue component at each "pixel" (picture element) of the rasterized video image. More sophisticated graphics processors have additional channels—the RGB components are called channels—which can be used to store other types of information. For example, the TARGA 32 graphics processor from AT&T has an additional channel called the "alpha" channel into which a "transparency" value is stored. This value controls a sophisticated interaction between the live RGB video input buffer and the static internal display buffer, which allows for the creation of sophisticated overlays of the image in memory with the video input. An instruction to "capture" a video image results in the transfer to this display buffer of digital information which describes one field (two frames) of the video image. This image remains resident within the display buffer of the graphics processor until it is replaced or otherwise flushed. Subsequent modifications of the captured video image, including superimposing of the created objects will involve modification and manipulation of the data stored in this display buffer.

Assembly of CAD Model

In order to render an image of the proposed additions to a captured view of the selected environment, a computer model is assembled which describes the proposed additions. Preferably, the computer model comprises a CAD (computer aided design) model of the object or objects to be added to the environment. The CAD model consists of a point, line and connectivity file which describes the critical dimensions for the object. For simple objects, the CAD model can be manually constructed by creating list of specific points where the lines of the object intersect and a second list which describes the connectivity between these points. For most projects, however, it is simpler and more expedient to use a commercially available architectural CAD program to create the computer model. This typically involves using a digitizing tablet to enter in specific points from the architectural plans that describe the proposed additions. The CAD image can be derived from plans, elevations, sections and perspectives assembled for this purpose from the materials produced by the project designer. Where the proposed addition to the environment was originally designed on an architectural CAD program, the CAD description of the addition can be imported directly to the system of the present invention.

Architectural CAD programs are usually provided with an internal coordinate system, which can be set up to correspond with an external coordinate system, but this is usually impractical if the building being assembled does not lay in alignment with the external coordinate grid. It is preferable to allow the model to be constructed with the CAD system's own grid referencing system and then to later insert data points within the CAD model which give external grid coordinates to specific internal points so that all points described within the CAD model can be rotated and translated to correspond with their proper position within the external grid system.

The particular external coordinate (grid) system used is not critical and may, for example, be an arbitrary system established for a particular job because of special constraints or desired results. However, it is preferably that all such grid systems be related to a reference point in the state plane coordinate system. By either directly using the state plane coordinate system as the known external coordinate system or by tying the special coordinate system to the state plane coordinate system, it will facilitate relating one project to another and will allow information from existing city, county and state maps to be used directly.

CAD files are conventionally structured in "layers" of information so that components may be logically grouped and selectively viewed. When a pre-existing CAD model created by an architectural CAD system is used and imported into the system of the present invention, only those "layers" of information which describe the external or internal surfaces to be viewed are utilized. Notes and symbols will be removed from the layers to be used, leaving only the data describing the structures which are to be modeled.

When using an externally created CAD model, reference points must be established within the model to tie the local coordinate system of the CAD model to the external coordinate system used in the acquisition of the video footage of the environment.

Other attributes may be assigned to the CAD model components at this time, such as material descriptions, colors, transparencies, lighting conditions, and other factors so that the model can be rendered as a solid surface textured model as well as a wire frame image. Texture mapping techniques can be used to add realism to the video image. Various textures, such as concrete, stucco, various types and styles of bricks, etc. are defined for the elements of the CAD model and this information is associated with the elements individually or with groups of associated elements. It will be understood, however, that these attributes such as color, material, transparencies, etc. may, if desired, be added at a later stage in the process.

At this point, the process of overlaying a computer CAD model onto the video image of the environment is ready to commence. However, prior to overlaying the proposed additions, it is preferable to create a verification model to test image alignment and confirm the accuracy of the information describing the camera vantage point, center of view, etc. This is done by creating a computer model of existing landmarks or temporarily erected artificial markers placed in the field of view of the video camera, which was used as a part of capturing the base video image. CAD descriptions of these elements, displaying horizontal and vertical characteristics, are created and established as a computer model for overlay onto the video image of the environment. If the verification model can be overlaid to register correctly with the corresponding landmarks on the captured video image, then the information concerning that particular scene can be considered as valid. Otherwise, corrections are made to the camera location data in order to achieve proper registration.

Overlay of Computer Model on Captured Video Imagery

Figure 7:
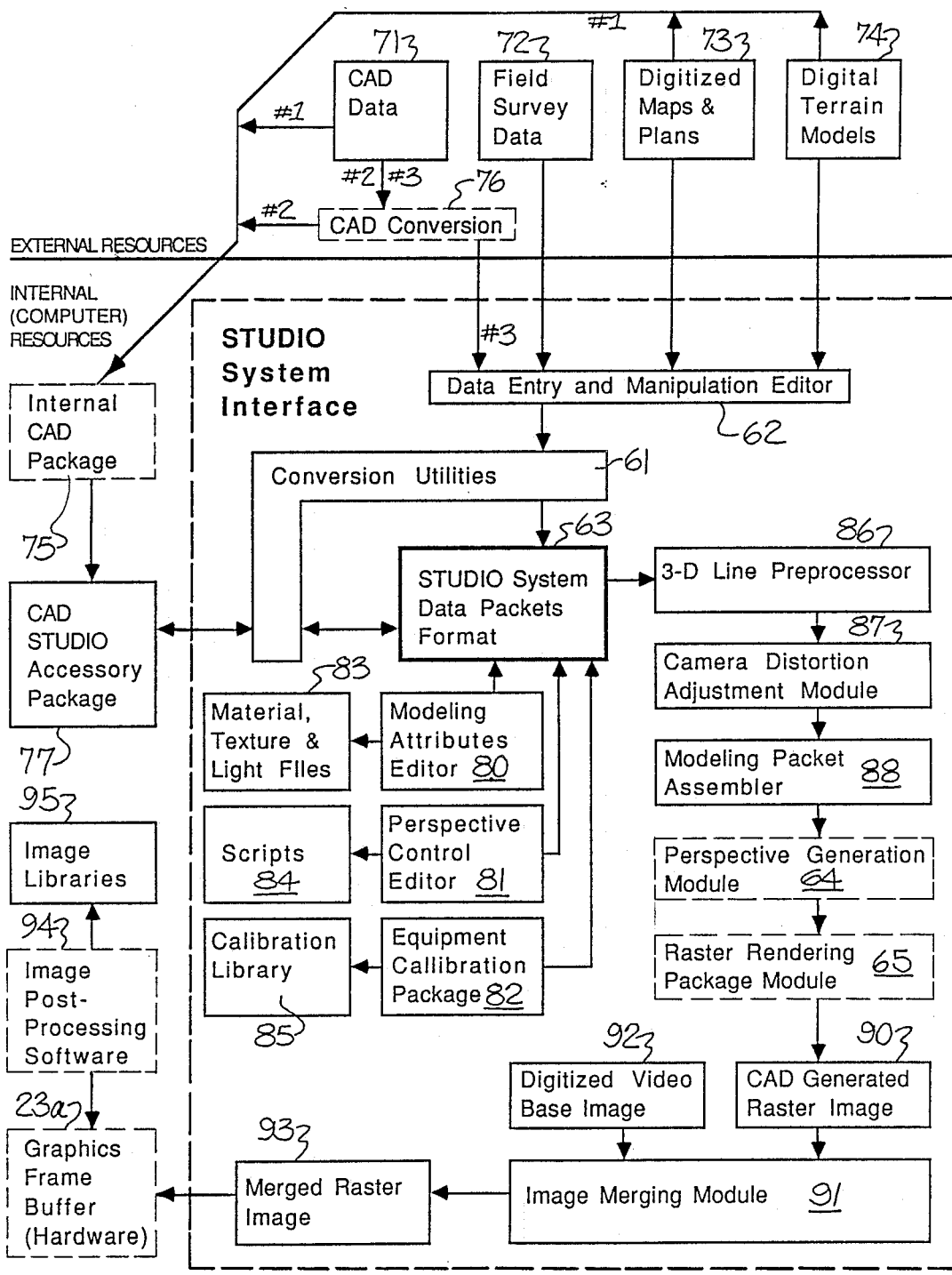
FIG. 7 is a block schematic diagram showing the organization of the software used in the system of the invention.

The overlay process involves the controlled interaction of several system components: the graphics frame buffer 23a, the three-dimensional CAD model of the additions, a perspective Generation Software Module 64 (FIG. 7) which generates a two-dimensional raster representation object in a three-dimensional perspective which corresponds with the perspective of the video image of the environment (as defined by the camera location and center of view) and a line Pre-Processor Software Module 86 (FIG. 7).

The perspective Generation Software Module 64 projects the three-dimensional object onto a picture plane located between the three-dimensional object in space and the point of view of the viewer and thereby produces a two-dimensional raster representation of the three-dimensional object. Perspective Generation Software Modules form a part of many commercially available architectural CAD systems, and the construction and details of operation of these modules are well understood by persons skilled in this art. Accordingly, to avoid unduly lengthening this specification, a detailed description of the organization and operation of the perspective Generation Module will not be given herein. It should be noted, however, that perspective Generation Modules may generate perspective in one of several ways, and there are several variations and adaptations of these techniques. The first is based on traditional linear perspective, and the second is based on spherical perspective. Each deals with image distortion differently. Linear perspective is more easily calculated and takes less processing time, but certain inherent image distortion results, especially near the perimeter of the view. The image distortion resulting from linear perspective calculations does not correspond with the image distortion produced by the lens of a video camera capturing the background view. Spherical perspective is much more intensive in processing requirements, but its distortion characteristics are much closer to camera lens distortion. While either linear or spherical perspective can be used, spherical perspective is preferred because of the closer correspondence between the camera lens image distortion of the background and the image distortion resulting from the spherical perspective projection of the added objects. The use of spherical perspective in the perspective Generation Module results in greater accuracy in the development of the video imaging simulation The software rendering algorithms form a separate part of the system from the CAD component and are used to plot the computer CAD model onto the video image of the background using a specified pixel location in the frame buffer as the center of view. This point is set each time a simulation is performed to match the calibrated center of view of the camera used to capture the background image. This point corresponds to any point along the center of view line which runs from the camera lens to the location and the distance which is the "center of view" point. The rest of the image is plotted around this point.

Software Organization

FIG. 7 and the text which follows describe more fully the software components of the present invention. Those elements shown in FIG. 7 with a hatched line are commercially available elements which are currently supplied by third parties and are incorporated as part of the overall system of the present invention.

Base data used in the creation of a CAD (computer aided design) model for rendering with the system is collected from a variety of external sources. These sources include CAD data 71 derived from an external source, field survey data 72 collected in the field concerning the project at hand, maps and plans 73 describing the project which are digitized and entered into the system and related digital terrain models 74. Each type of data may have one or more routes into the system.

I. The first type of data is in the form of CAD generated data files 71 depicting a proposed project. The data represents the form, mass and detail of the structures to be overlaid onto a captured video image of the proposed site. Descriptive computer models may be generated on CAD systems external to the STUDIO System or they may be created with an internal CAD program 75 supported within the STUDIO System. If the CAD data was generated externally, the data which is to be transferred to the STUDIO System may be input through one of three routes:

Route #1: If an external CAD system is used to generate the computer model and that system's CAD software creates data files in the same format as the package running within the STUDIO System then utilizing the CAD data is a simple task. The CAD data can be transferred directly to the STUDIO System's host computer 20 where the internal CAD package 75 can access it. The data can then be manipulated and utilized just as if it had been created internally. This route is indicated in FIG. 7 by the #1 arrows.

If the external and internal CAD packages differ in their data formats then the data from the external CAD package must be translated by a CAD Conversion Module 76 before it can be used. Converted CAD data may follow two different routes into the STUDIO System depending on how the data is to be used. If the system operator wishes to have the ability to modify or enhance the incoming data at some later point during the project the data must be converted into a format which his compatible with the one used by the internal CAD package 75. Data converted in this way would follow Route #2. Alternately, if the incoming data is considered complete enough to model the project without additional preparation the data may be converted directly into the STUDIO System packet format to prepare it for modeling. Data handled in this way would follow Route #3.

Route #2: Data following Route #2 might be converted into one of several "standard" or "universal" formats (such as IGES or DXF) or in some cases formats which have been adapted by other major CAD packages that are readable by the internal CAD package. Alternately, data might be converted directly into the preferred host format of the CAD package internal to the STUDIO System. The choice of how the data will be converted and packaged for delivery to the STUDIO System's internal CAD package will be dependent on the type of CAD package that was initially used to create the original data base and the availability of conversion routines to transform the data base into an alternate format.

The conversion routines used by the CAD conversion unit are known and there are several existing providers of conversion services for CAD users who wish to transfer CAD files to another system.

Route #3: Data following Route #3 would be converted from the external data format directly into the data packet format used by the STUDIO System software. This approach mirrors the conversions which are performed on the data created with the internal CAD package when it is translated into the STUDIO System data packet format prior to rendering. As with all incoming information, the data is first converted into a standard format that is understood by the STUDIO System. Then, rather than passing this data on to the internal CAD package the data is transformed into the proper STUDIO System data packet format using internal conversion utilities 61. As with other types of data input, the data entry process and access to the internal conversion utilities 61 is controlled by the Data Entry and Manipulation Editor 62. By sending CAD data along this route the external CAD package essentially becomes a replacement of the internalized CAD package.

II. Field survey data 72 includes locations, ambient conditions such as climatic conditions, times of data gathering and any other pertinent information which describes the environment being studied. Additionally, all field data describing geographical locations is referenced to a set coordinate system that becomes the basis for relating the various parts of the proposed project and are often collected from diverse sources. This data may include:
* Descriptions of camera locations;
* Position of the distant points in space on which individual views are centered;
* Camera settings such as lens focal length, focus, current calibration values;
* Locations of pertinent reference points;
* Date, time of day (for general info, sun angle calculations, etc.);
* Weather and climatic conditions.

Such data is used to establish viewing positions and environmental conditions associated with the captured imagery into which the rendered version of the proposed additions is to be placed. This data is necessary in order to execute the rendering of computer-generated additions to the captured video imagery as accurately and faithful to the prevailing environmental conditions as possible. As with other types of information input, the data entry process and access to the internal conversion utilities 6 is controlled by the Data Entry and Manipulation Editor 62. The editor forms an interface between the user and raw data to manage the input of information. Such data may be manually entered through the keyboard or passed to the machine through a physical linkage of the system computer to an external data collection device such as a digitizing tablet or a specially crafted data collection device.

III. Much of the base information describing elements for addition to the subject environment, assembled at the beginning of a simulation project, comes in the form of blueprints or other printed matter. Such materials may contain information regarding the shape and composition of the proposed elements (construction blueprints/drawings), important landmarks, chosen camera positions, building descriptions or other important numerical and descriptive data (e.g materials, colorations, etc.). It is necessary to enter this information into the STUDIO System by hand and/or with the aid of electronic data entry devices such as digitizing tablets or automated digitizing machines. The entry of such data into the STUDIO System may follow one of two different routes. Route #1 would be to use the facilities present in the internal CAD system to enter descriptive data. All professional CAD packages that are competitive within the design market are equipped with a facility for entering data through the use of a digitizing tablet 33 (this is true of the CAD program currently coupled with the STUDIO System). This allows the user to enter map information such as contours and spot elevations, architectural plan, elevation and other data describing the project and its environment into the CAD program with a great deal of ease. It takes advantage of existing software which has been developed for the manual entry of building data. This route would be most effective for entering large amounts of data by hand such as pertinent information from a set of building plans.

Route #2 also entails entering data through the interface presented by the STUDIO System Data Entry and Manipulation Editor 62 via the keyboard 31, digitizing tablet 33 or other entry device, but bypasses the internal CAD package. This route for data entry would be most effective for the entry of small amounts of data or the entry of predefined data packets which are downloaded from an external device. The intent of the present invention is not to duplicate the facilities found in existing CAD programs, yet, there is still a need for the system user to be able to enter various types of data directly into the STUDIO System. Examples of this type of information are field data which has been marked on existing maps, simple objects which can be described by a small number of points and their connectivity, bits of data which are made available in printed form and other types of computer generated data files that do not represent CAD data.

Typically, data will be entered using both routes during the course of a project. The more complex data sets will be entered via either an external or internal CAD program and simple data sets will be entered directly into the project data base through the STUDIO System interface.

IV. Digital terrain models 74 (DTMs) are a specialized type of computer model which have similarities to those generated with CAD software, but describe land forms. In general these types of data sets are created by engineering firms from aerial photographs as part of the process of constructing topographic maps, though other groups create them for various reasons in a variety of ways. In general these types of data files are very large and they must be processed in ways that few existing CAD programs are capable of handling. Such data must first be created in or converted to a format that the STUDIO System or its companion CAD program can read. Data set size is often the most limiting characteristic that must be dealt with. DTM data sets are usually very large and unwieldy until they are segmented into usable subsets. The division of larger data sets into smaller subsets may be handled before the information is entered into the system or after. Internally, the data would be subdivided by a function of the CAD package or by utilities at the disposal of the STUDIO System's Data Entry and Manipulation Editor 62.

Since DTMs usually form large blocks of information already in computer readable form and will need little if any manual manipulation, the most likely scenario for the entry of a digital terrain model follows Route #2. The model would be entered into the system as a complete data set or as manageable subsets and be converted by STUDIO System software. Afterward, the resulting files may be broken down further if necessary. Treated as a block, the data can be used in image production or be further refined with the aid of the companion CAD program.

Route #1 in the above diagram might be followed in situations where small terrain models are to be entered via the companion CAD program or created within it. When the amount of data to be assembled is relatively small, using the internal CAD package is an efficient way to assemble a DTM to become part of a simulation model. For larger DTMs it is more efficient to acquire them from an external source since the STUDIO System, initially, is not intended to be used in the creation of such large data bases.

The Data Entry and Manipulation Editor 62 is a software interface for handling the entry of various types of data directly into the STUDIO System. This editor presents the system user with a structured environment which manages the input of data and brings into service some of the conversion utilities necessary to make use of data entered in standardized formats.

Certain clarifying bits of information must be associated with each type of data being entered before the data can be utilized or converted into an alternate format. Some examples of the types of information that must be collected to make use of desired input data are:

1. For CAD data:
   * What standard data format is being used? (ex. IGES [Initial Graphics Exchange Specification], DXF [Data Transfer Format] GKS [Graphics Kernel System], PHIGS [Programmer's Hierarchical Interactive Graphics Standard], CGM [Computer Graphics Metafile] or one of the several data formats used by popular commercial CAD products)
   * Are attributes to be added to the incoming data?
   * What attributes are to be added?
   * How are the attributes to be added?
       To the file as a whole?
       To discrete elements in the file?
           How are elements delineated?
   * Are separate elements to be placed in separate data packets or are they to be combined into one packet?
2. For field survey data:
   * What kind of data is to be entered?
       Positions
       Camera settings
       Climatic conditions
       Time of day, year
   * Is data temporary or permanent?
   * How is it to be stored?
       With the source CAD data?
       As a separate data file?
3. For digitized maps and plans:
   * What Kind of data is to be entered?
       Plans
       Elevations
       Sections
       Topographic
       Bearings/property lines
   * What type of input device is to be used?
       Keyboard
       2-D or 3-D digitizing tablet mouse
   * Are any attributes to be added and what kind?
4. For digital terrain models:
   * What type of format is the data in?
   * Is the data segmented and if not is the data to be segmented?
       How is the data to be segmented?
   * In what form is the data to be stored?
       As a complete file?
       Into its component segments?

The examples given above are illustrative of the range of information that may be collected in order to prepare the system to treat input data properly. Other types of information may be required to support the acquisition of data to be handled by the STUDIO System's conversion utilities 61.

The internal CAD package 75 is a software product created by a third party developer which is operable within the same hardware system in which the studio System software is operating. It is from within this package that most of the development of project models used in the simulation process is undertaken. This package also serves as an editor for many of the existing files created on an external system which are ported to the STUDIO System for use in a simulation project. The type of CAD package chosen for integration with the STUDIO System product depends on the desired field of application (architecture, landscape architecture, engineering and graphic design for example).

The CAD accessory package 77 is a software package which is used from within the third-party CAD program paired with the STUDIO System. This package is the interface between the two systems and is in many ways similar in function to the Data Entry and Manipulation Editor 62, though more limited in scope. This package is coded with the aid of a macro development software which must be available for any CAD product to be paired with STUDIO System software. A macro is a pseudo program which is designed to be used from within an existing host program while it is being executed. Macros are written in much the same way as any other piece of software. The language syntax used is usually based on an existing standard programming language such as "C" or "Pascal" and the resulting code is assembled using a specialized compiler which will make the macro code compatible with the host program in which it is to be used. As such, they will seem to operate as a direct extension of the facilities of the host CAD program paired with the STUDIO System. These macros allow the system user to perform such functions as:

1. Add and assign attributes to the elements within the data files being developed;
2. Collect data describing special characteristics of the model;
3. Establish reference grids;
4. Convert the model and save it in a data format that can be read by the STUDIO System data packet conversion utilities;
5. Establish positions and characteristics of light sources.
6. Convert a model from the STUDIO System data packet formats into a format readable by the CAD program and load it into memory.

In general, the use of macros gives one the ability to write pieces of code which perform necessary functions from within a CAD program and take advantage of the existing user interface. This allows the system user to complete STUDIO System tasks without having to leave the CAD system and without having to suffer the confusion that would normally be associated with moving between the different interfaces presented by two software programs.

Once the desired base data has been assembled and saved in a form readable by the STUDIO System software the data is ready to be compiled into data packet format 63. Once in this form, modeling data can then to be run through the rendering pipeline. One can think of the process in terms of the metaphor of a hydraulic pipeline. Materials having a certain form go in one end of a pipe, are acted upon within the pipe and come out the other end of the pipe with an altered form. The modules of the rendering pipeline perform several operations on the data packets (raw material) with the end result of the process being a raster image simulation of proposed changes to a project site.

The Conversion Utilities 61 internal to the STUDIO System are primarily used to convert data to and from the system data packet format 63. Using the information gathered concerning the data's origin and destination, the utilities operate on the selected files to convert their data into the appropriate format for their intended destination. The two potential destinations are either the rendering side of the system or the CAD package 75 linked to the system. The STUDIO System data format is comprised of several types of Data Modules which are referred to as packets. Data is placed into one of several modules depending on its type, such as: camera position and parameters, polygon vertices, connectivity of the polygons, materials lists and other types.

Data is sent in packet format to the Perspective Generation Module 64 and Raster Rendering Package Module 65 Keeping data in a modular format allows for the manipulation of individual data packets (such as material attributes) without affecting others.

Three editors work directly on the data packets created within the STUDIO System. These are the Modeling Attributes Editor 80, the Perspective Control Editor 81 and the Equipment Calibration Package 82.

The Modeling Attributes Editor 80 is used to manipulate three forms of data: object attributes, materials and textures and light sources.

1. Object Attributes: The Modeling Attributes Editor 80 handles all the addition and manipulations of model attributes that are assigned within the STUDIO System interface. These attributes, which collectively constitute a material, include the colors, textures and transparency of the model elements and what type of shader algorithms are to be used, to name a few options. Many of its capabilities are duplicated within the CAD STUDIO Accessory Package 77. This editor allows the system user to create new material and texture map files and edit existing ones. The existing files may have been created within the CAD program, via the accessory package, or by the Modeling Attributes Editor. This editor also allows the user to specify the attachment of these materials to polygon data contained in the CAD model.

2. Materials and Textures: This editor interface is used to create, label, store and edit texture maps and associated attributes recorded in materials files which are used in the rendering of the model. The material and texture map files form a library of existing material specifications (the Material and Texture Map Library 83) which can be drawn on when assigning characteristics to model elements which are to be rendered at a later stage. This library 83 will be an expandable resource for the system user.

3. Light Sources and Positions: This editor interface is used to create, label, store and edit light sources and associated attributes in light files which are used in the rendering of the model. The light files form a library of existing lighting configurations and specifications which can be drawn on when assigning light sources to a model which is to be rendered at a later stage. This part of library 83 will also be an expandable resource for the system user.

The Perspective Control Editor 81 is used to set and manipulate details of camera placement, settings and calibration for the renderings to be generated, and the rendering preferences.

Some of the camera information managed is the:
* viewing position;
* position of center of view;
* position of clipping planes relative to the viewer;
* movements relative to a specified position.

Rendering Preferences: Within the Perspective Control Editor 81 the rendering preferences are also set. These preferences are used to orchestrate the sequence of events executed by the image Generation Modules and controls how the model is to be rendered. Specific preferences include but are not limited to:
* Type of model to be generated (wire-frame, solid, textured).
* Is image to be merged with a background image?
* The file name of the background.
* Are long 3-D lines to be preprocessed?
* In what format should the file be saved?

The Perspective Control Editor 81 is also used to set up and record sequences of views which can be later used to develop a series of rendered images which might be used for purposes such as simulating movement through a space (animation).

These sequences are called scripts and are saved in a separate resource file, a script library 84. Scripts are used to orchestrate "batch processing" of simulation imagery. They describe a sequence of camera positions, settings and other important data which are used in generating a sequence of images. The batch processing of images allows for several images to be rendered and manipulated without the attention of a system operator.

The Equipment Calibration Package 82 is used by the system operator during the process of calibrating video cameras and other video input equipment which is to be used in conjunction with the STUDIO System. Before any imagery generated from a new piece of video equipment can be used to generate accurate simulation imagery, the equipment must be calibrated. The process of calibration quantifies the impact that individual pieces of equipment have on video and computer imagery in terms of image distortion and registration. The Equipment Calibration Package 82 presents the system user with several tests which can be run to evaluate equipment that has not been calibrated before of for which the current calibrations are suspect. These tests are employed to determine:
* The true center of view for imagery produced with a video device (this is done for cameras, recorders, playback devices and the employed combinations of camera-recorder-playback devices);
* Range of angles of view for video camera lenses;
* Lens distortion for video cameras;
* Offset between the center of view of captured video imagery and the center plotting location of the graphics frame buffer.

Collected equipment calibration data is stored in two files. First, the data describing the camera used for the current job is stored as part of the STUDIO System data packets assembled for the job at hand. This becomes part of the permanent job record. The data is also stored in a Calibration Library 85 for future use and reference. The library 85 contains a data history for all calibrated equipment beginning when any device is initially tested and including data from any subsequent testing.

Once all the required data is in the form of STUDIO System data packets the rendering process can be started. The sequence forms a pipeline through which the assembled data packets are passed. Each module in the pipeline acts on certain individual data packets in specific ways. Not all packets will necessarily be acted upon by any one module. Nor will all modules be invoked every time data is passed through the pipeline. Certain modules may be deactivated in order to expedite the processing of preliminary imagery for example. The designation of which optional modules are to be invoked or bypassed during a rendering session may be specified at the time of rendering or through a rendering preferences file which is contained as part of the rendering scripts associated with the Perspective Control Editor. By keeping certain types of data separate from others it is possible to make changes to one aspect of the project without having to disturb other aspects. For example, in the case where a change is made to the material attributes of a model but not the viewing positions, the Modeling Packet Assembler 88 allows the user to incorporate these changes into an existing view without having to regenerate the perspective model data for that viewing situation.

The first part of the rendering process involves performing any specialized processing specified in the Rendering Preferences file and organizing the collected data into a Modeling packet which is sent on to the Rendering Module.

Figure 8:
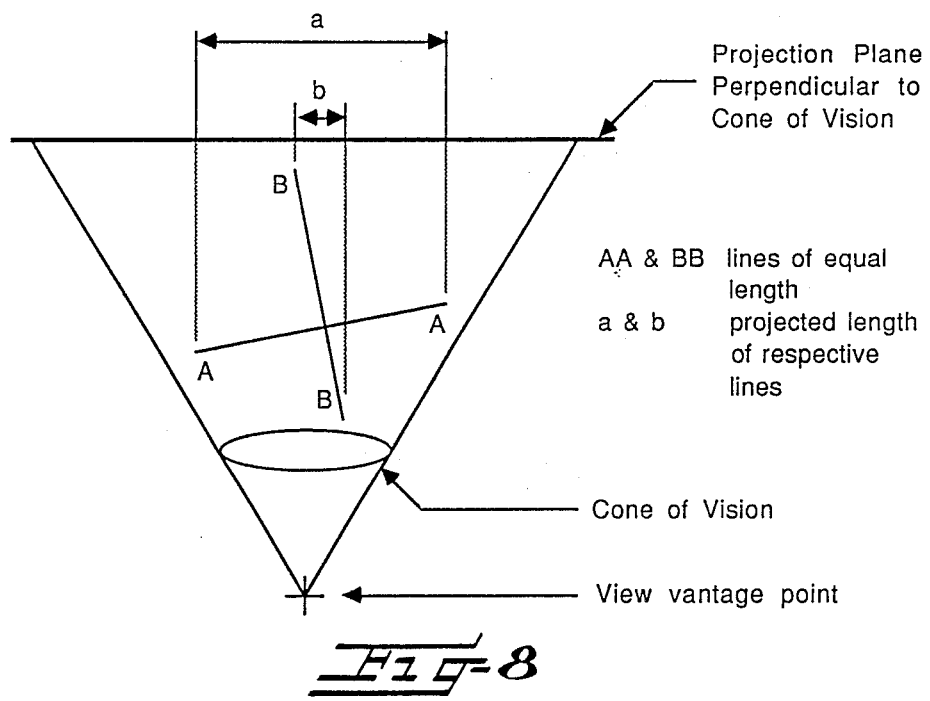
FIG. 8 is a diagram illustrating how the 3-D line preprocessor breaks down long lines in the model into shorter segments.

The 3-D Line Preprocessor 86 is an optional operation which is employed to increase the accuracy of a generated imagery. It does so by breaking down selected long lines in the CAD file into a series of shorter line segments. The appearance of the segmented lines, when run through the Perspective Generation Module 64, will more closely approximate the distorted characteristics of lines observed in captured video imagery. The first time the rendering pipeline is invoked or any time that a viewing position is changed the process begins at the top of the sequence with the 3-D Line Preprocessor 86. This process may or may not be executed depending on whether it is specified in the Rendering Preferences file. Its execution will add significant time to the overall rendering process since all lines in the file will need to be processed to discern which should be segmented. This module only operates on the list of points which describe the an object and does not actually do any perspective transformations. The required transformations are done later in the Perspective Generation Module 64. The purpose of the 3-D Line Preprocessor is to break down any long lines in the model's data file into shorter segments before the model is rendered. A line is selected in the 3-D Line Preprocessor by considering its position in space relative to the selected vantage point and determining the distance it will traverse within the cone of vision of the viewer, as shown in FIG. 8. If the projected view of the line is considered long enough, then it is broken down into smaller segments. The processed line will now be treated as a series of smaller lines when the data is passed to the Perspective Generation Module 64. This allows the endpoints of the smaller line segments to be used in figuring the adjusted path that the line should take when it is drawn to the graphics buffer. This is necessary because perspective algorithms presently only work on the position of the endpoints of lines and not the paths of lines themselves.

Figure 9:
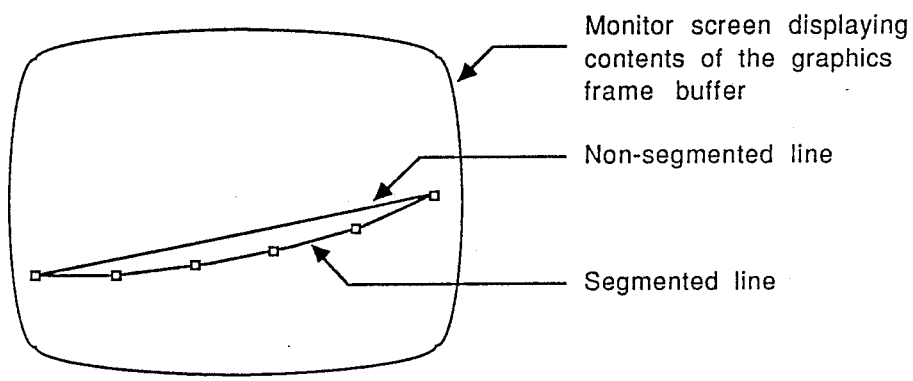
FIG. 9 is a diagram which compares the appearance of a non-segmented line and a segmented line.

The collection of smaller lines now create the perception that a straight line is bending as if distorted by a lens. The segments are drawn and the resulting image gives the impression of a single warped line. In order to create the perception that a straight line is bending (as if distorted by a lens) the line must be broken down into smaller segments, as shown in FIG. 9, so that the perspective algorithms can adjust each of the newly created end points. The segments are then drawn and the resulting image will give the impression that a single warped line has been drawn. By using spherical perspective algorithms and this segmenting technique, the lines and images drawn to the graphics buffer will seem to be distorted in a manner similar to video imagery taken of a real-world situation which was captured with a video camera.

Figure 10:
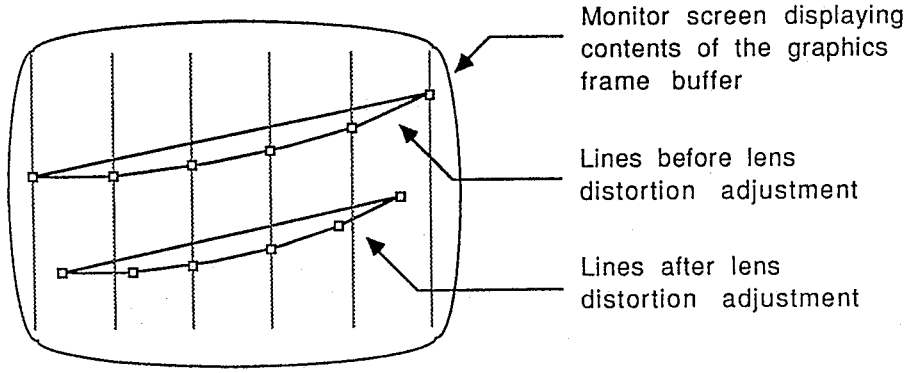
FIG. 10 is a diagram illustrating the effect of the Camera Distortion Adjustment Module on the line.

As the next step, adjustments to the model data set to compensate for camera lens distortion may be undertaken to allow the rendering process to produce a more accurate simulation. The Camera Distortion Adjustment Module 87 uses the calibration data associated with the specific camera which was used to collect the source video data to do one final adjustment of the model data. The model adjusted by the module will more closely reflect the same distortion as the source video imagery to which it is to be paired, as shown in FIG. 10.

This process may or may not be executed depending on weather it is specified in the Rendering Preferences file. This module should only be executed in conjunction with the 3-D Line Preprocessor 86. Otherwise, its impact will be corrupted in the case of lines which traverse a significant part of the generated view. The execution of this module will add significant time to the overall rendering process. Like the 3-D Line Preprocessor Module, this one only operates on the list of points which describe the object and does not actually do any perspective transformations. The required transformations are done as a later step by the Perspective Generation Module 64.

The Modeling Packet Assembler 88 takes the data which has been preprocessed by the 3-D Line Preprocessor 86 and the Camera Distortion Adjustment Module 87 and combines it with all other data describing the camera, material choices and lighting to be used in rendering the model. Once the various types of data have been combined in the proper order the data package is ready to be sent on to the Perspective Generation and Raster Rendering Modules 64, 65 where the image is created.

The Perspective Generation Module 64 takes the 3-D data, view positions and material attributes describing the model and performs all of the necessary viewing transformations on the model data.

The Perspective Generation Module 64 performs:
1. All specified matrix transformations for scaling, rotating and repositioning the model;
2. Viewing transformations based on specified camera positions, centers of view and "up" direction designation;
3. Shader preprocessing;
4. Clipping operations for specified front and back clipping planes 5. Perspective transformations based on specified camera data;
6. and executes line drawing preview images if requested.

This resulting data is passed directly on to the Raster Rendering Package Module 65 for generation of a raster image. The Raster Rendering Package Module 65 takes the processed data passed to it by the Perspective Generation Module 64 and generates a fully rendered raster image 90 ready for display or merging with a rasterized video base image.

The images generated by the Raster Rendering Package Module 65 will depict the modeled structure in realistic color. (The range of colors available for the generation of the raster image will be dependent of the type of graphics buffer used. For example, a 24-bit per pixel graphics buffer is capable of displaying 16.8 million distinct colors. The number of colors which can be displayed simultaneously depends on the pixel resolution of the graphics buffer used.) The rendering process involves determining the color and other values of each pixel (picture element) represented by the Graphics Frame Buffer 23a. Other values associated with a pixel can be represented by the Graphics Frame Buffer. Other values associated with a pixel are currently limited to a transparency value. The software however may include other values such as a distance value for each pixel relative to the camera view point. The transparency value (alpha channel) is used by the Image Merging Module 91 when merging the generated raster image with a rasterized video background image 92. This designates, for the Merging Module 91, which pixels are transparent and to what degree.

Images produced by the Raster Rendering Package Module may be generated in one of four forms:
1. wire-frame model—The model is presented as a line drawing. This is the fastest of the three modeling types and is used mainly of previewing images.
2. solid color model—The model is presented as a solid form by rendering individual polygons with chosen colors and using a specified light source to determine shading characteristics. It is the quickest of the solid model rendering options.
3. texture mapped model—This model is similar to the solid color model but uses sophisticated texture mapping techniques to impart the qualities of actual materials to the model elements. It is capable of generating very life-like images. The processing times required are very long.
4. combination solid and textured model—This model contains some elements that are rendered with solid colors and others that are rendered with texture maps. Not all situations require that texture maps be used to generate the desired life-like quality. Mixing textured objects with solid rendered objects is a good way to cut down on processing time yet retain the desired sense of realism.

Higher forms of 2,3 and 4 would include the generation of cast shadows and environment mapping whereby the environment surrounding an object is reflected by reflective surfaces. This is a specialized form of texture mapping.

Once the computer generated model has been rendered it is ready for merging with a rasterized video base image if the Rendering Preferences specify that this is to be done.

The base image may be treated as a simple background onto which the generated image is overlaid or it may be accompanied by data describing its depth characteristics which will allow the generated image to be merged into it. The addition of depth and transparency characteristics to the color information already contained in the raster image allows for the sophisticated layering of the generated image into a captured video background image. Further refinement of the image can be achieved as a later operation by the addition and adjustment of image elements with post-processing software. The base image may also be preprocessed to remove or alter any existing elements that will be affected by the proposed additions, such as removing buildings which will be demolished, etc.

When finished, or as it is being generated, the raster image is transferred to the Graphics Frame Buffer 23a where it can be viewed with a color monitor 41 that is connected to the buffer.

The Graphics Frame Buffer 23a is a random access memory (RAM) space within the graphics processor board 23 which is linked electronically with a display device. It is a hardware device of which there are several version on the market. The Graphics Frame Buffer 23a is the system user's "window" into the graphic world created within a computer.

Once an image is placed into the graphics frame buffer 23a it can be acted on by any other software program which has the capability of accessing and manipulating the frame buffer being used. Such image pre/post-processing software is indicated in FIG. 7 at 94.

This gives the system user the opportunity to further embellish or manipulate details of imagery generated within the STUDIO System. Such products include available "paint" programs which give the user the ability to draw or paint on images within the frame buffer. Other types of programs allow the user to do sophisticated image processing manipulations such as creating four color separations from the images which can then be used in the production of printed materials and publications. Other image processing programs allow the user to extract information from digitized imagery by using false coloration techniques to reveal hidden patterns.

The use of image post-processing software 94 gives the user the ability to take advantage of Image Libraries 95 which hold digitized imagery of a variety of elements which can be combined with images generated by the system to enhance their quality and flexibility. Such elements include trees, plants, cars, people and anything else that can be derived from digitizing video imagery or generated as compatible computer graphics.

An image library 95 has a usefulness comparable to an architect's entourage book giving the designer the ability to pick and choose from a series of images representing a range of commonplace elements such as architectural features, useful artifacts and people shown in a variety of situations. Such an image library will be most useful if supported as a database with an effective identification and retrieval mechanism.

Images generated by the STUDIO system may vary in complexity from simple overlaid wire frames with some manual embellishment to a sophisticated series of computer generated, fully textured images intended to depict an animated move through an environment.

Once the visual simulations have been completed, they must be output to suitable media. Many options are available including film printers which produce a full color copy in transparency, print or negative format;

paper printers, such as black and white or color thermal printers or laser printers which produce the printed image directly onto paper stock; or video output directly to tape, cable or live broadcast. The latter is the most convenient form, since a video signal is continuously being generated by the system. A real time accounting of all activities affecting the graphic buffer can be recorded as a simulation session progresses. In producing a direct video output, an analog RGB signal is obtained from the graphics frame buffer and directed to a video encoder, which in turn, converts the analog RGB signal into a conventional NTSC signal capable of display on a NTSC video monitor or recording by video recording devices, such as video tape recorders or video disk recorders.

Camera Calibrations

Figure 11:
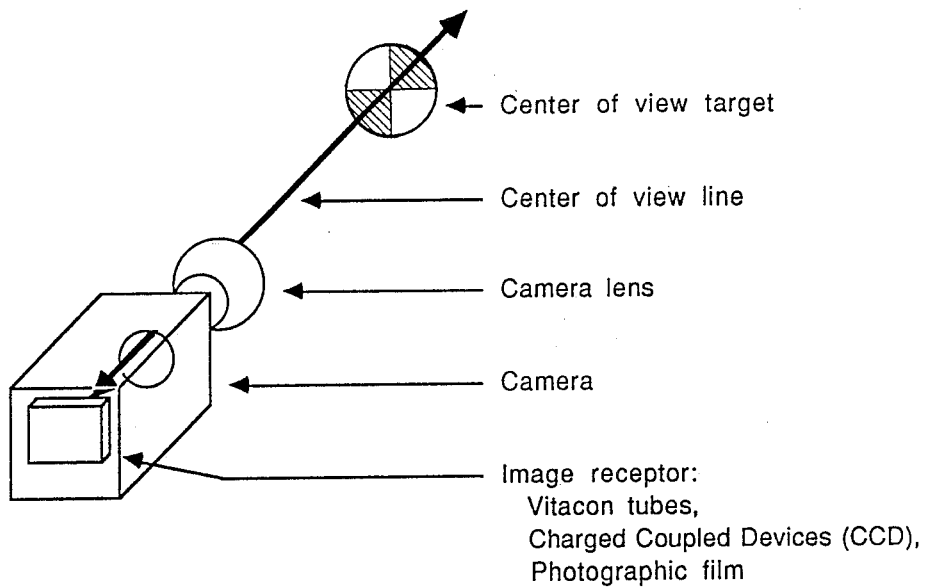
FIGS. 11, 12 and 13 are diagrams illustrating how the video camera is calibrated to locate the true center of view.
Figure 12:
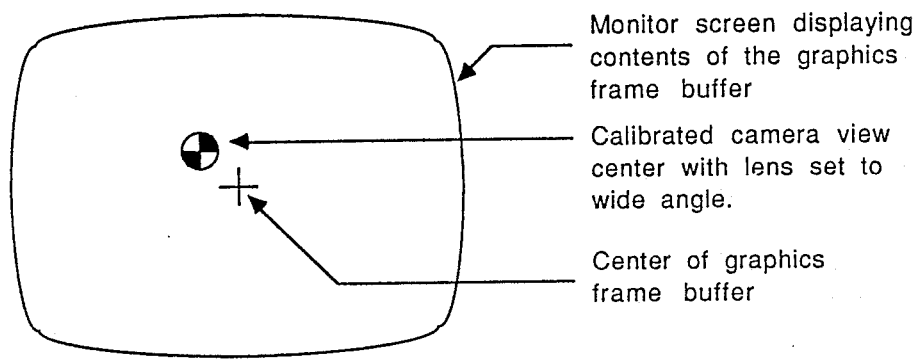
Figure 13:
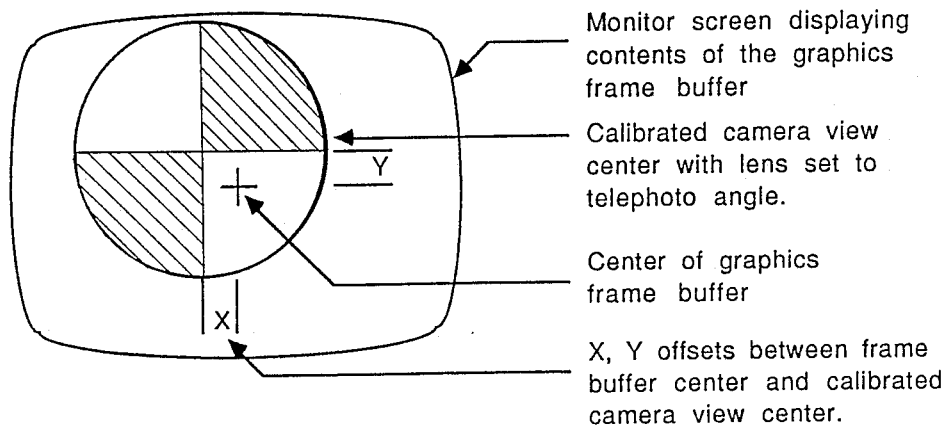

FIGS. 11 to 13 illustrate how calibration data for a particular camera may be obtained in order to locate the true center of view of the camera. As shown in FIG. 11, the camera is aimed at a specific point or target positioned at a distant location and, with the camera lens set to its narrowest viewing angle, adjusted so that the target is located in the approximate center of the camera viewfinder. At this point, as shown in FIG. 12, a cursor (cross-hair) is drawn into the graphics memory buffer 23a at the point coinciding with the centering point of the target. Now, without moving the camera, the lens setting is adjusted to a wider viewing angle, as is shown in FIG. 13. If the chosen center point does not correspond to the true camera/lens center of view, then "image migration" will be observed as the camera lens viewing angle is adjusted. The cross-hair is adjusted to a different point along an imaginary line connecting the old cross-hair position and the centering point on the viewed object. The cross-hair is repositioned to this point and the process is repeated. The process is completed when adjusting the camera lens viewing angle from wide angle to a narrower angle no longer causes the center of view of the viewed object to migrate from the pixel marked by the cross-hair. This pixel then represents the true center of view for the camera/lens being calibrated. It is noteworthy that the calibrated center of view of a camera/lens pair rarely coincides exactly with the center point of the graphics frame buffer into which the image is captured, as shown in FIGS. 12 and 13. The coordinates of this pixel are recorded, and this pixel will be used as the center of view for any computer generated imagery which is to be overlaid onto the captured video imagery from this camera/lens combination.

That which is claimed:

1. A video imaging system for producing a video image simulation realistically depicting how a simulated object would appear in an actual environment, comprising
    (a) video input means for receiving a captured video image of an actual environment, the image having been obtained at a particular location in the actual environment and the image having a particular perspective;
    (b) graphics processor means for receiving the video image from said video input means and for storing the video image in rasterized form;
    (c) field data input means for receiving field location data regarding the location of the captured video image and field perspective data regarding the perspective of the captured image;
    (d) object data input means for receiving data for a three-dimensional model of a simulated object which is proposed to be included in the environment;
    (e) means for generating from the three-dimensional model of said object, through the use of said field perspective data, a two-dimensional perspective representation of the object in a perspective which accurately matches the perspective of the captured video image of the actual environment; and
    (f) means for merging the thus generated two-dimensional perspective representation of the object with said rasterized video image of the environment and for positioning the object, through the use of said field location data, so that the object is precisely positioned at the proper location in its environment.

2. A system as set forth in claim 1 including video output means operatively connected to said graphics processor means for producing a video signal of the simulation.

3. A system as set forth in claim 1 wherein said object data input means comprises means for receiving CAD data for a three-dimensional CAD model of the simulated object.

4. A system as set forth in claim 3 wherein the three-dimensional CAD model comprises a wire frame model.

5. A system as set forth in claim 3 wherein the three-dimensional CAD model comprises a solid model.

6. A system as set forth in claim 1 wherein said field data input means additionally includes means for receiving data relating to the ambient conditions, such as weather, date and time of day, existing at the location when the video image was captured.

7. A system according to claim 1 additionally including
    a material and texture library containing a collection of maps defining available materials and surface textures for the object, and
    texture mapping means operatively associated with said means for generating a two-dimensional perspective representation of the object for imparting to the two-dimensional representation of the object a surface appearance defined by a map selected from said material and texture library.

8. A system as set forth in claim 7 wherein said data input means includes means operable by the user of the system for assigning to the object, materials and textures selected from said material and texture library.

9. A system as set forth in claim 1 additionally including
    an image library containing a collection of additional image elements for the environment, and
    pre/post-processing image enhancement means, including means for selecting additional image elements from said image library and for adding such elements to the merged image produced by said means for merging for thereby enhancing the simulation.

10. A video imaging system for producing a video image simulation realistically depicting how a simulated object would appear in an actual environment, comprising
    (a) video input means for receiving a captured video image of an actual environment, the image having been obtained at a particular location in the actual environment and the image having a particular perspective;

(b) graphics processor means for receiving the video image from said video input means and for storing the video image in rasterized form;

(c) field data input means for receiving field location data regarding the location of the captured video image in relation to a known coordinate system and field perspective data regarding the perspective of the captured image;

(d) object data input means for receiving CAD data for a three-dimensional CAD model of a simulated object which is proposed to be included in the environment;

(e) object reference point input means for defining reference points representing known locations on the three-dimensional model and for assigning to said reference points coordinates in said known coordinate system where the reference points on the object are to be located;

(f) means for generating from the CAD data for the three-dimensional CAD model of said object, through the use of said field perspective data, a two-dimensional perspective representation of the object in a perspective which accurately matches the perspective of the captured video image of the actual environment; and (g) means for merging the thus generated two-dimensional perspective representation of the object with said rasterized video image of the environment and for positioning the object, through the use of said field location data, so that the defined reference points on the object are located at the proper coordinates in said known coordinate system of the actual environment so that the object is precisely positioned with respect to its environment.

11. A system as set forth in claim 10 wherein said means for generating a two-dimensional perspective representation includes means for reorienting the three-dimensional model so as to correspond with its proper orientation and scale in the actual environment before producing said two-dimensional perspective representation of the object.

12. A system as set forth in claim 10 wherein the field location data regarding the captured video image includes lighting condition data, and said system additionally including modeling means responsive to said lighting condition data for imparting to the object lighting conditions corresponding to those present in the captured video image of the environment to thereby further enhance the realism of the simulation.

13. A video imaging system for producing a video image simulation realistically depicting how a simulated object would appear in an actual environment, comprising (a) video input means for receiving a captured video image of an actual environment;

(b) graphics processor means for receiving the video image from said video input means and for storing the video image in rasterized form;

(c) field data input means for receiving field location data including the coordinates of a camera location which captured the video image in relation to a known coordinate system, the coordinates of at least one other known location in the field of view of the camera, and data relating to the optical characteristics of the camera which captured the video image;

(d) object data input means for receiving CAD data for a three-dimensional CAD model of a simulated object which is proposed to be included in the environment;

(e) object reference point input means for defining reference points representing known locations on the three-dimensional model and for assigning to said reference points coordinates in said known coordinate system where the reference points on the object are to be located;

(f) means for rotating, translating and scaling the three-dimensional CAD model so that the reference points on the three-dimensional model input by said object reference point input means coincide with the proper coordinate locations in the coordinate system of the actual environment, (g) means for generating from the three-dimensional model of said object, through the use of said field perspective data, a rasterized two-dimensional perspective representation of the object in a perspective which accurately matches the perspective of the captured video image of the actual environment;

(h) means for superimposing the thus generated rasterized two-dimensional perspective representation of the object with said rasterized video image of the environment at corresponding coordinate locations in said coordinate system, so that the object is precisely positioned at the proper location in its environment, and to thereby produce a video image simulation accurately depicting the object as it would appear in the actual environment, and (i) video output means for producing a video display of the thus produced video image simulation.

14. A system for producing a video image realistically depicting how a simulated object would appear in an actual environment, comprising:

(a) video input means for capturing a video image of the actual environment, the image having been obtained at a particular point of observation in the actual environment and with a particular point of view;

(b) graphics processor means for receiving said video image and forming therefrom a rasterized video image;

(c) object data input means, including means for storing data representing a three-dimensional CAD model of a simulated object which is proposed to be included in the environment;

(d) object data conversion means, including (1) means for receiving perspective data indicating the point of observation and the direction of view of the captured video image of the actual environment;

(2) means for receiving reference points representing known locations on the three-dimensional CAD model and their proper coordinate positions in the coordinate system of the actual environment;

(3) means for rotating, translating and scaling said three-dimensional CAD model so that said reference points on the three-dimensional CAD model coincide with the proper coordinate position in the coordinate system of the actual environment;

(4) means for generating from said three-dimensional CAD model, a two-dimensional rasterized image providing a perspective representation of the three-dimensional image with the point of observation and direction of view represented by said perspective data;

(5) means for superimposing the thus produced two-dimensional rasterized image of said object onto the captured rasterized video image of the actual environment at the corresponding coordinate locations in said coordinate system to thereby produce a synthesized composite video image depicting the object as it would appear in the actual environment; and (e) video output means for producing a video display of the thus produced synthesized composite video image.

15. The system according to claim 14 wherein said object data input means includes means for receiving and storing surface texture data representing the surface texture of the object, and wherein said means for generating a two-dimensional rasterized image of the object from said three-dimensional CAD model includes means for rendering a two-dimensional wire frame model with the surface texture defined by said surface texture data to form a surface textured solid model of the object.

16. A method of producing a video image simulation realistically depicting how a simulated object would appear in an actual environment, comprising
(a) capturing an image of the actual environment,
(b) converting the captured image into rasterized form,
(c) obtaining field location data regarding a location of the captured image and field perspective data regarding the perspective of the captured image,
(d) providing object data defining a three-dimensional model of a simulated object which is proposed to be included in the environment,
(e) generating from the three-dimensional model of the object, through the use of the field perspective data, a rasterized two-dimensional perspective representation of the object in a perspective which accurately matches the perspective of the captured image of the actual environment, and
(f) merging the thus generated rasterized two-dimensional perspective representation of the object with said rasterized image of the environment while positioning the object, through the use of said field location data, so that the object is precisely positioned at the proper location in the environment.

17. A method as set forth in claim 16 wherein said step of providing object data defining a three-dimensional model comprises inputting CAD data for the simulated object.

18. A method as set forth in claim 16 including obtaining data relating to ambient conditions, such as weather, date and time of day, existing at the location when the video image was captured.

19. A method as set forth in claim 16 including storing in a material and texture library a collection of maps defining available materials and surface textures for the object, and texture mapping the two-dimensional representation of the object to impart to the object a surface appearance as defined by a selected map from said material and texture library.

20. A method as set forth in claim 16 including storing in an image library a collection of additional image elements for the environment, and selecting additional image elements from said image library and adding such elements to the merged video image to thereby enhance the simulation.

21. A method of producing a video simulation image realistically depicting how a simulated object would appear in an actual environment, comprising
(a) capturing with a camera and storing in a storage medium an image of the actual environment;
(b) obtaining field location data accurately identifying a point of observation and direction of view of the captured image in relation to a known coordinate system;
(c) providing CAD data for a three-dimensional model of a simulated object which is proposed to be included in the environment;
(d) defining within the CAD model reference points representing known locations on the three-dimensional model and assigning to said reference points the coordinates in said known coordinate system where the reference points of the object are to be located;
(e) generating from the three-dimensional CAD model of said object a two-dimensional image providing a perspective representation of the three-dimensional object using the same point of observation and direction of view as used in the captured image of the actual environment; and
(f) superimposing the thus produced two-dimensional image of said object onto the captured image of the actual environment at corresponding coordinates in said coordinate system to thereby produce a video image depicting the object as it would appear in the actual environment.

22. The method of claim 21 wherein said CAD model comprises a wire frame image.

23. The method of claim 21 wherein said CAD model comprises a solid model.

24. The method of claim 21 wherein the captured image of the environment is a still image.

25. The method of claim 21 wherein the captured image of the environment is a moving image.

26. A method of producing a video image realistically depicting how a simulated object would appear in an actual environment, comprising
(a) capturing and storing an image of the actual environment;
(b) obtaining site data accurately identifying a point of observation and direction of view of the captured image in relation to a known coordinate system;
(c) selecting a landmark in the captured image of the actual environment;
(d) identifying from a map or survey, coordinates defining the location of said landmark in relation to said known coordinate system;
(e) creating a CAD verification model of the selected landmark and assigning to said model said coordinates in said known coordinate system which define the location of the landmark;
(f) superimposing the CAD verification model of said landmark onto said captured image at corresponding coordinates in said coordinate system to thereby ascertain the accuracy of the site data obtained in step (b), and correcting the site data, if necessary, to ensure that the CAD verification model of said landmark is in registration with the image of the landmark;
(g) providing a three-dimensional CAD model of a simulated object which is proposed to be included in the environment;

(h) establishing within said CAD model reference points representing known locations on the model and assigning to said reference points coordinates in said known coordinate system;

(i) generating from the three-dimensional CAD model of the object a two-dimensional image providing a perspective representation of the three-dimensional object based upon said site data so that the perspective view of the object matches that of the actual environment; and (j) superimposing the thus produced two-dimensional image of said object onto the captured image of the actual environment at corresponding coordinates in said coordinate system to thereby produce a video image depicting the object as it would appear in the actual environment.

27. A method for producing a video image realistically depicting how a simulated object would appear in an actual environment, comprising (a) positioning a camera at a predetermined location in the actual environment and obtaining therefrom an image of the actual environment;

(b) obtaining and storing data accurately identifying the location of the camera in the actual environment and its direction of view with respect to a known coordinate system;

(c) rasterizing the image of the actual environment obtained from said camera and storing the rasterized image;

(d) providing data representing a three-dimensional CAD model of a simulated object which is proposed to be included in the environment, said model being comprised of data defining a vector representation of the object;

(e) establishing within the three-dimensional model, reference points representing known locations on the model, and assigning to said reference points coordinate positions in the coordinate system of the actual environment, and rotating, translating and scaling the model so that known locations on the model are positioned at their proper locations in the coordinate system of the actual environment;

(f) converting the vector representation of said model into a two-dimensional rasterized representation of the object in a three-dimensional perspective corresponding with the perspective of the image of the environment captured by the camera; and (g) overlaying the thus produced rasterized representation of the object with the rasterized image of the actual environment to thereby produce a video image depicting the object as it would appear in the actual environment.

28. A video imaging system for producing a video image simulation realistically depicting how a simulated object would appear in an actual environment, comprising (a) video input means for receiving a captured video image of an actual environment;

(b) graphics processor means for receiving the video image from said video input means and for storing the video image in rasterized form;

(c) field data input means for receiving field location data regarding the precise location of the captured video image and field perspective data regarding the perspective of the captured image;

(d) object data input means for receiving CAD data for a three-dimensional CAD model of a simulated object which is proposed to be included in the environment;

(e) means operatively associated with said object data input means for translating the input CAD data from one CAD data format to another standard CAD data format;

(f) means for generating from the three-dimensional CAD data for said object, through the use of said field perspective data, a two-dimensional perspective representation of the object in a perspective which accurately matches the perspective of the captured video image of the actual environment; and (g) means for merging the thus generated two-dimensional perspective representation of the object with said rasterized video image of the environment and for positioning the object, through the use of said field location data, so that the object is precisely positioned at the proper location in its environment.

29. A video imaging system for producing a video image simulation realistically depicting how a simulated object would appear in an actual environment, comprising (a) equipment calibration means for generating calibration data relating to characteristics of particular pieces of video input equipment which may be used to capture the video image which is input to said video input means, and (b) an equipment calibration library for storing the equipment calibration data which is generated by said equipment calibration means, (c) video input means for receiving a captured video image of an actual environment;

(d) graphics processor means for receiving the video image from said video input means and for storing the video image in rasterized form;

(e) field data input means for receiving field location data regarding the precise location of the captured video image and field perspective data regarding the perspective of the captured image;

(f) object data input means for receiving data for a three-dimensional model of a simulated object which is proposed to be included in the environment;

(g) means for generating from the three-dimensional model of said object, through the use of said field perspective data, a two-dimensional perspective representation of the object in a perspective which accurately matches the perspective of the captured video image of the actual environment; and (h) means for merging the thus generated two-dimensional perspective representation of the object with said rasterized video image of the environment and for positioning the object, through the use of said field location data and said equipment calibration data, so that the object is precisely positioned at the proper location in its environment.

30. A video imaging system for producing a video image simulation realistically depicting how a simulated object would appear in an actual environment, comprising (a) video input means for receiving a captured video image of an actual environment, the image having been obtained at a particular location in the actual environment and the image having a particular perspective;

(b) graphics processor means for receiving the video image from said video input means and for storing the video image in rasterized form;

(c) field data input means for receiving field location data regarding the location of the captured video image in relation to a known coordinate system and field perspective data regarding the perspective of the captured image;

(d) object data input means for receiving CAD data for a three-dimensional CAD model of a simulated object which is proposed to be included in the environment;

(e) object reference point input means for defining reference points representing known locations on the three-dimensional model and for assigning to said reference points coordinates in said known coordinate system where the reference points on the object are to be located;

(f) means for generating from the CAD data for the three-dimensional CAD model of said object, through the use of said field perspective data, a two-dimensional perspective representation of the object in a perspective which accurately matches the perspective of the captured video image of the actual environment, said means for generating a two-dimensional perspective representation including means for rotating and translating the three-dimensional CAD mode with the use of said reference points so that the reference points coincide with the proper coordinate position in the coordinate system of the environment; and (g) means for merging the thus generated two-dimensional perspective representation of the object with said rasterized video image of the environment and for positioning the object through the use of said field location data, so that the defined reference points on the object are located at the proper coordinates in said known coordinate system of the actual environment so that the object is precisely positioned with respect for its environment.

31. A video imaging system for producing a video image simulation realistically depicting how a simulated object would appear in an actual environment, comprising (a) video input means for receiving a captured video image of an actual environment, the image having been obtained at a particular location in the actual environment and the image having a particular perspective;

(b) graphics processor means for receiving the video image from said video input means and for storing the video image in rasterized form;

(c) field data input means for receiving field location data regarding the location of the captured video image in relation to a known coordinate system and field perspective data regarding the perspective of the captured image, the field perspective data including data defining a location of the camera and a center of view of the video image seen by the camera;

(d) object data input means for receiving CAD data for a three-dimensional CAD model of a simulated object which is proposed to be included in the environment;

(e) object reference point input means for defining reference points representing known locations on the three-dimensional model and for assigning to said reference points coordinates in said known coordinate system where the reference points on the object are to be located;

(f) means for generating from the CAD data for the three-dimensional CAD model of said object, through the use of said field perspective data, a two-dimensional perspective representation of the object in a perspective which accurately matches the perspective of the captured video image of the actual environment, said means for generating a two-dimensional perspective including means for transforming the perspective of the two-dimensional representation in accordance with said field perspective data defining the camera location and center of view; and (g) means for merging the thus generated two-dimensional perspective representation of the object with said rasterized video image of the environment and for positioning the object, through the use of said field location data, so that the defined reference points on the object are located at the proper coordinates in said known coordinate system of the actual environment so that the object is precisely positioned with respect to its environment.

32. A video imaging system for producing a video image simulation realistically depicting how a simulated object would appear in an actual environment, comprising (a) video input means for receiving a captured video image of an actual environment;

(b) graphics processor means for receiving the video image from said video input means and for storing the video image in rasterized form;

(c) field data input means for receiving field location data regarding a precise location of the captured video image in relation to a known coordinate system and field perspective data regarding the perspective of the captured image;

(d) object data input means for receiving CAD data for a three-dimensional CAD model of a simulated object which is proposed to be included in the environment;

(e) object reference point input means for defining reference points representing known locations on the three-dimensional model and for assigning to said reference points coordinates in said known coordinate system where the reference points on the object are to be located;

(f) means for generating from the CAD data for the three-dimensional CAD model of said object, through the use of said field perspective data, a two-dimensional perspective representation of the object in a spherical perspective to closely match any image distortion of the captured video image of the actual environment;

(g) means for merging the thus generated two-dimensional perspective representation of the object with said rasterized video image of the environment and for positioning the object, through the use of said field location data, so that the defined reference points on the object are located at the proper coordinates in said known coordinate system of the actual environment so that the object is precisely positioned with respect to its environment.

33. A video imaging system for producing a video image simulation realistically depicting how a simulated object would appear in an actual environment, comprising (a) video input means for receiving a captured video image of an actual environment, the image having been obtained at a particular location in the actual environment and the image having a particular perspective;
(b) graphics processor means for receiving the video image from said video input means and for storing the video image in rasterized form;
(c) field data input means for receiving field location data regarding the location of the captured video image in relation to a known coordinate system and field perspective data regarding the perspective of the captured image;
(d) object data input means for receiving CAD data for a three-dimensional CAD model of a simulated object which is proposed to be included in the environment;
(e) object reference point input means for defining reference points representing known locations on the three-dimensional model and for assigning to said reference points coordinates in said known coordinate system where the reference points on the object are to be located;
(f) means for generating from the CAD data for the three-dimensional CAD model of said object, through the use of said field perspective data, a two-dimensional perspective representation of the object in a perspective which accurately matches the perspective of the captured video image of the actual environment, said means for generating a two-dimensional perspective representation including line preprocessor means for segmenting long lines of the three-dimensional model into shorter segments before conversion to two-dimensional perspective so that long straight lines present in the object will be distorted in a way similar to distortion present in the captured video image of the environment; and
(g) means for merging the thus generated two-dimensional perspective representation of the object with said rasterized video image of the environment and for positioning the object, through the use of said field location data, so that the defined reference points on the object are located the proper coordinates in said known coordinate system of the actual environment so that the object is precisely positioned with respect to its environment.

34. A video imaging system for producing a video image simulation realistically depicting how a simulated object would appear in an actual environment, comprising
(a) video input means for receiving a captured video image of an actual environment, the image having been obtained at a particular location in the actual environment and the image having a particular perspective;
(b) graphics processor means for receiving the video image from said video input means and for storing the video image in rasterized form;
(c) field data input means for receiving field location data regarding the location of the captured video image in relation to a known coordinate system and field perspective data regarding the perspective of the captured image;
(d) object data input means for receiving CAD data for a three-dimensional CAD model of a simulated object which is proposed to be included in the environment;
(e) object reference point input means for defining reference points representing known locations on the three-dimensional model and for assigning to said reference points coordinates in said known coordinate system where the reference points on the object are to be located;
(f) means for generating from the CAD data for the three-dimensional CAD model of said object, through the use of said field perspective data, a two-dimensional perspective representation of the object in a perspective which accurately matches the perspective of the captured video image of the actual environment, said means for generating a two-dimensional perspective including means for compensating for camera lens distortion to thereby provide a more accurate simulation; and
(g) means for merging the thus generated two-dimensional perspective representation of the object with said rasterized video image of the environment and for positioning the object, through the use of said field location data, so that the defined reference points on the object are located at a proper coordinates in said known coordinate system of the actual environment so that the object is precisely positioned with respect to its environment.

35. A method of producing a video image simulation realistically depicting how a simulated object would appear in an actual environment, comprising
(a) capturing an image of the actual environment;
(b) converting the captured image into rasterized form;
(c) obtaining field location data regarding the precise location of the captured image and field perspective data regarding the perspective of the captured image;
(d) providing CAD data defining a three-dimensional model of a simulated object which is proposed to be included in the environment;
(e) translating the input CAD data from one CAD data format to another standard CAD data format;
(f) generating from the three-dimensional model of the object, through the use of the field perspective data, a rasterized two-dimensional perspective representation of the object in a perspective which accurately matches the perspective of the captured image of the actual environment; and
(g) merging the thus generated rasterized two-dimensional perspective representation of the object with said rasterized image of the environment while positioning the object, through the use of said field location data, so that the object is precisely positioned at the proper location in the environment.

* * * * *